(12) United States Patent
Ono

(10) Patent No.: US 11,100,671 B2
(45) Date of Patent: Aug. 24, 2021

(54) IMAGE GENERATION APPARATUS, IMAGE GENERATION SYSTEM, IMAGE GENERATION METHOD, AND IMAGE GENERATION PROGRAM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 16/654,027

(22) Filed: Oct. 16, 2019

(65) Prior Publication Data
US 2020/0043195 A1 Feb. 6, 2020

Related U.S. Application Data

(63) Continuation of application No. PCT/JP2018/016699, filed on Apr. 25, 2018.

(30) Foreign Application Priority Data

May 16, 2017 (JP) .............................. JP2017-097594

(51) Int. Cl.
*G06T 7/73* (2017.01)
*G06T 7/55* (2017.01)
(Continued)

(52) U.S. Cl.
CPC ............. *G06T 7/73* (2017.01); *G06T 3/0018* (2013.01); *G06T 7/33* (2017.01); *G06T 7/55* (2017.01); *G06T 2207/20212* (2013.01)

(58) Field of Classification Search
CPC .... G06T 7/73; G06T 7/55; G06T 7/33; G06T 3/0018; G06T 2207/20212; G06T 3/4038;
(Continued)

(56) References Cited

U.S. PATENT DOCUMENTS

2002/0063711 A1  5/2002  Park et al.
2013/0155293 A1  6/2013  Lee et al.
(Continued)

FOREIGN PATENT DOCUMENTS

EP  3086283     10/2016
JP  2006189940   7/2006
(Continued)

OTHER PUBLICATIONS

"International Search Report (Form PCT/ISA/210) of PCT/JP2018/016699", dated Jul. 10, 2018, with English translation thereof, pp. 1-3.
(Continued)

*Primary Examiner* — Chan S Park
*Assistant Examiner* — Daniel C Chang
(74) *Attorney, Agent, or Firm* — JCIPRNET

(57) ABSTRACT

An image generation apparatus includes an image acquisition part that acquires a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group; a composition information acquisition part that analyzes the acquired wide angle image group and acquires composition information to be used for compositing the telephoto image group; and a composite image generation part that generates an image in which the telephoto image group is composited, information related to focal lengths of the wide angle optical system and the telephoto optical system, and the telephoto image group.

20 Claims, 24 Drawing Sheets

(51) Int. Cl.
*G06T 7/33* (2017.01)
*G06T 3/00* (2006.01)

(58) Field of Classification Search
CPC . G06T 2207/30244; G06T 2207/10016; G06T 2207/10032; G06T 7/579; H04N 5/23212; H04N 5/23206; H04N 5/2258; H04N 5/23238; G03B 37/02; G03B 15/006; G03B 37/00

See application file for complete search history.

(56) References Cited

U.S. PATENT DOCUMENTS

| | | | | |
|---|---|---|---|---|
| 2015/0145958 | A1* | 5/2015 | Inoue | G03B 35/08 348/46 |
| 2016/0028949 | A1* | 1/2016 | Lee | H04N 5/23232 348/218.1 |
| 2017/0289461 | A1* | 10/2017 | Ono | H04N 5/247 |

FOREIGN PATENT DOCUMENTS

| | | |
|---|---|---|
| JP | 2007164258 | 6/2007 |
| JP | 2011211260 | 10/2011 |
| JP | 2017022574 | 1/2017 |
| WO | 2008146114 | 12/2008 |
| WO | 2016080081 | 5/2016 |

OTHER PUBLICATIONS

"Written Opinion of the International Searching Authority (Form PCT/ISA/237) of PCT/JP2018/016699", dated Jul. 10, 2018, with English translation thereof, pp. 1-11.

"Search Report of Europe Counterpart Application", dated Mar. 13, 2020, pp. 1-5.

* cited by examiner

FIG. 1
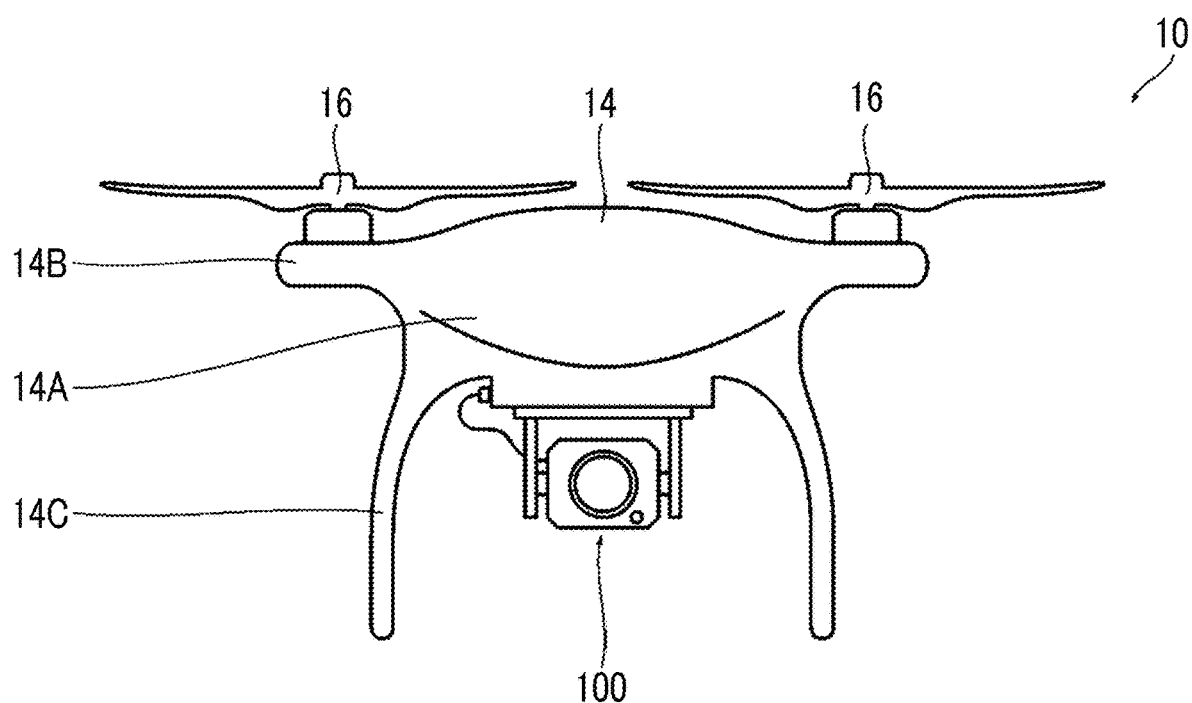
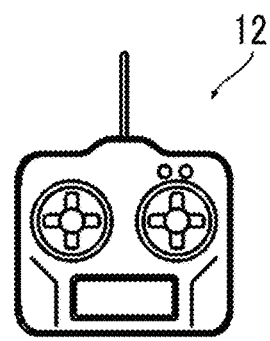

FIG. 19
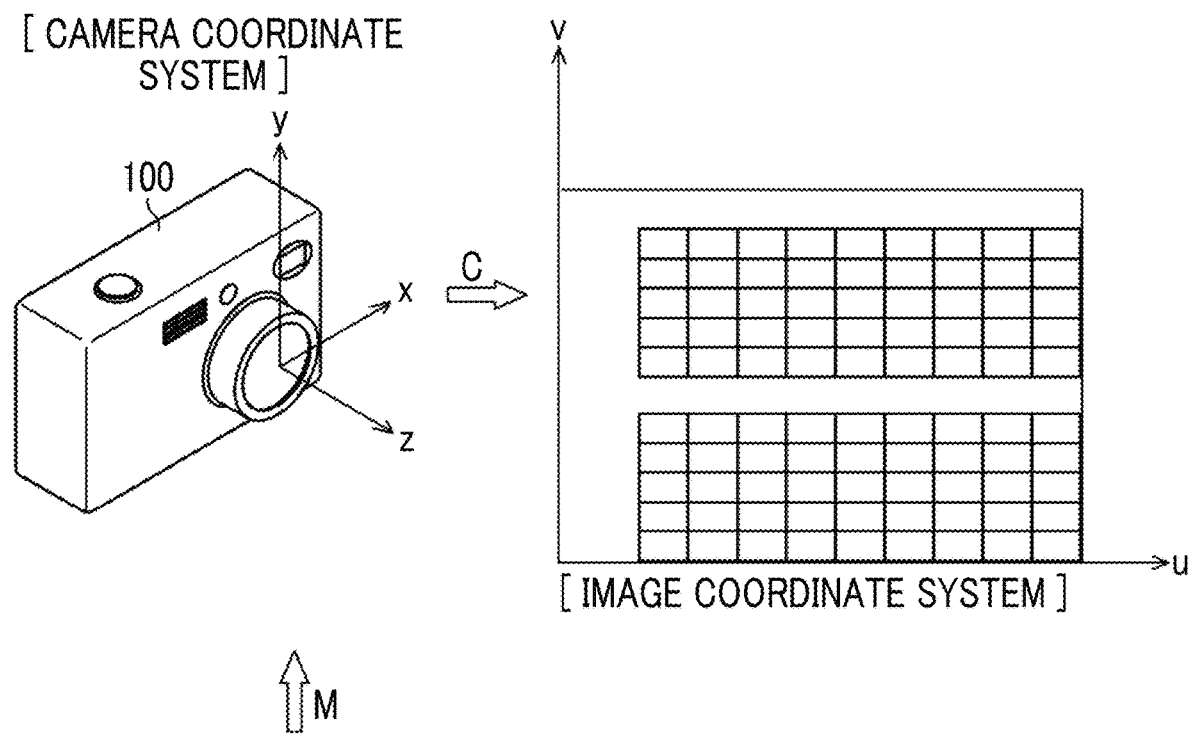
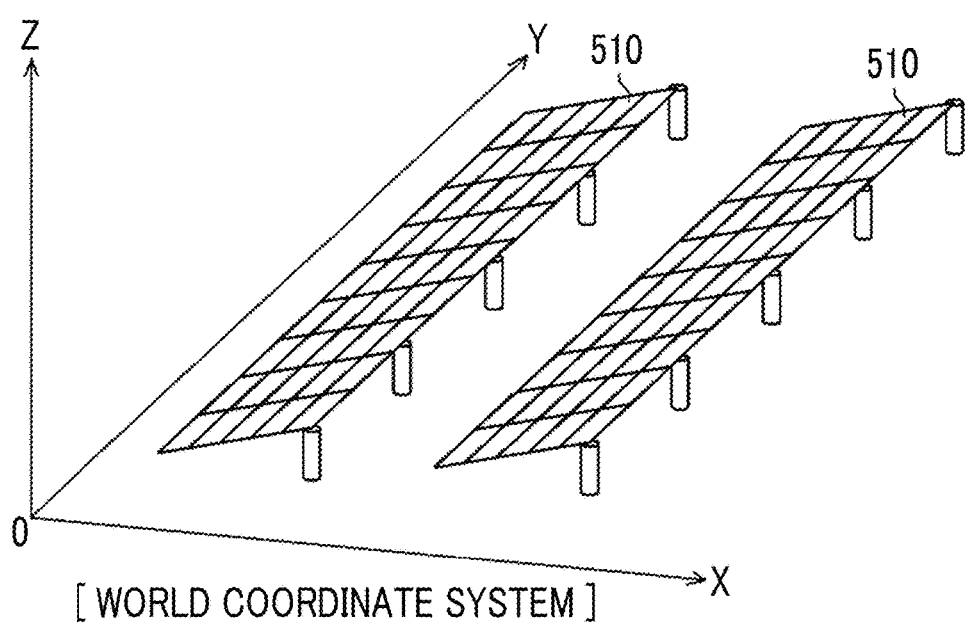

IMAGE GENERATION APPARATUS, IMAGE GENERATION SYSTEM, IMAGE GENERATION METHOD, AND IMAGE GENERATION PROGRAM

CROSS-REFERENCE TO RELATED APPLICATIONS

This application is a Continuation of PCT International Application No. PCT/JP2018/016699 filed on Apr. 25, 2018, which claims priority under 35 U.S.C. § 119(a) to Japanese Patent Application No. 2017-097594 filed on May 16, 2017. Each of the above application(s) is hereby expressly incorporated by reference, in its entirety, into the present application.

BACKGROUND OF THE INVENTION

1. Field of the Invention

The present invention relates to an image generation apparatus, an image generation system, an image generation method, and a non-transitory computer readable recording medium storing an image generation program and particularly, to a technology for generating a composite image from a plurality of images (image group) acquired by imaging a subject while moving an imaging position.

2. Description of the Related Art

A technology for acquiring a larger image by combining a plurality of images is present and is called panorama composition, stitching, and the like.

A mosaic image composition apparatus disclosed in JP2006-189940A composites one image (mosaic image) of a wide field of view from an image group of a narrow field of view captured while moving, and acquires the position and attitude information of a camera at the time of capturing each image as information to be used for the composition.

The position and the attitude information of the camera can be estimated by analyzing the image group. JP2006-189940A discloses a procedure of estimating the position and the attitude information of the camera for a (j+1)-th image in a case where the position and the attitude information of the camera for a j-th image (j<N−1) of N images are known.

First, feature points present in a region of overlap between the j-th image and the (j+1)-th image are associated, and an appropriate number of pairs of corresponding feature points are acquired. Next, the position and the attitude information of the camera at the time of capturing the (j+1)-th image with respect to the position and the attitude information of the camera at the time of capturing the j-th image are acquired such that the least square error between the feature points of the j-th image and the feature points of the (j+1)-th image in association is minimized.

Based on the acquired position and attitude information of the camera at the time of capturing the first image to the N-th image, one mosaic image of a wide field of view is composited by sequentially transforming (projecting) the first image to the N-th image to images in a mosaic image plane and combining the images.

JP2007-164258A suggests an image composition processing apparatus that captures a wide angle image and a telephoto image and composites one or a plurality of telephoto images in the wide angle image in order to acquire a high detail image. The wide angle image and the telephoto image are captured one at a time and may be images captured by changing the direction of the optical axis of the camera in a case where imaging is performed from the same location. Even in a case where a deviation occurs between the optical axis centers of the wide angle image and the telephoto image, the telephoto image can be deformed such that the telephoto image is captured from the optical axis of the wide angle image by performing projective transformation of the telephoto image, and it is possible to match subject images of both images.

JP2017-022574A discloses a system that captures a wide angle image and a telephoto image at the same time using one camera, measures the amount of change of an imaging range based on the wide angle image having a stable imaging range, and controls a moving object (a movement direction or a movement speed) in which the camera is mounted or the camera (or an imaging angle of view) based on the measurement result such that image processing such as region matching using the telephoto image is restricted to a normally processable range.

Furthermore, a structure from motion (SfM) method of tracking motions of multiple feature points from a motion picture in which the imaging position of the camera moves, and estimating the three-dimensional structure (structure) of a subject and a camera attitude (motion) at the same time is present. In recent years, an optimization calculation method called bundle adjustment has been developed, and high accuracy output is produced within an actual usage time period.

SUMMARY OF THE INVENTION

In the case of compositing one mosaic image of a wide field of view from the image group of a narrow field of view using the mosaic image composition apparatus disclosed in JP2006-189940A, a large number of overlapping parts (overlapping region between images) of the image group of a narrow field of view are necessary for extracting an appropriate number of corresponding feature points. Thus, a problem arises in that a large number of images are necessary. While the position and the attitude information of the camera at the time of imaging can be acquired using a sensor, a problem arises in that an expensive sensor is necessary for acquiring high accuracy information, or the accuracy of image composition is decreased.

In the SfM method, it is necessary to include multiple feature points in a plurality of images. Thus, images captured at a wide angle are used in order to perform favorable estimation. The wide angle images are effective for estimation of an approximate three-dimensional structure of the subject. However, a problem arises, in that the subject image in each image is small, and details of the subject cannot be checked.

The image composition processing apparatus disclosed in JP2007-164258A embeds (composites) one or a plurality of telephoto images in one wide angle image and acquires a high accuracy image in which the whole subject in a wide range is captured in detail. The image composition processing apparatus does not generate a composite image of a wider range than one wide angle range.

The system disclosed in JP2017-022574A captures a wide angle image and a telephoto image at the same time using one camera, measures the amount of change of the imaging range based on the wide angle image, and controls the moving object in which the camera is mounted or controls the camera. Accordingly, image processing such as region matching based on the telephoto image can be normally processed. However, information of the wide angle image is not used in the composition of the telephoto image.

The present invention is conceived in view of such matters. An object of the present invention is to provide an image generation apparatus, an image generation system, an image generation method, and a non-transitory computer readable recording medium storing an image generation program capable of favorably compositing a telephoto image group even in a case where the number of overlapping regions between images of the telephoto image group is small.

In order to achieve the object, an image generation apparatus according to one aspect of the present invention comprises an image acquisition part that acquires a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group; a composition information acquisition part that analyzes the acquired wide angle image group and acquires composition information to be used for compositing the telephoto image group; and a composite image generation part that generates an image in which the telephoto image group is composited based on the composition information, information related to focal lengths of the wide angle optical system and the telephoto optical system, and the telephoto image group.

In the wide angle image group and the telephoto image group acquired by the image acquisition part, the subject is imaged while changing the position of the imaging apparatus including the imaging optical system that includes the wide angle optical system and the telephoto optical system having the common optical axis. An image of a center region (region corresponding to the angle of view of the telephoto image) of each image of the wide angle image group and each image of the telephoto image group have different resolutions but are the same images.

Accordingly, the composition information to be used for compositing the telephoto image group can be acquired by analyzing the wide angle image group, and the telephoto image group can be favorably composited even in a case where an overlapping region between the images of the telephoto image group is small. Accordingly, the number of times of capturing the telephoto image group can be significantly decreased, and a high resolution composite image can be generated.

In the image generation apparatus according to another aspect of the present invention, it is preferable that the composition information acquisition part analyzes the acquired wide angle image group and estimates the position and an attitude of the imaging apparatus at a time of capturing each wide angle image of the wide angle image group as the composition information, and the composite image generation part composites the telephoto image group based on the position and the attitude of the imaging apparatus and an angle of view ratio between the wide angle optical system and the telephoto optical system.

By using the position and the attitude of the imaging apparatus at the time of capturing a certain wide angle image of the wide angle image group as a reference, the position and the attitude of the imaging apparatus in other wide angle images can be estimated by analyzing the image of the overlapping region of the wide angle image group. In addition, since a three-dimensional position of the subject can be estimated, the distance between the position of the imaging apparatus and the subject can be estimated. The angle of view ratio between the wide angle optical system and the telephoto optical system is a known value corresponding to the focal length ratio between the wide angle optical system and the telephoto optical system.

The wide angle image group and the telephoto image group have the same image center (optical axis). Thus, the position and the attitude of the imaging apparatus estimated by analyzing the wide angle image group can be applied to the telephoto image group, and the composition can be performed by deciding a composition position of each image of the telephoto image group using the estimated position and attitude of the imaging apparatus and the known angle of view ratio. However, an absolute scale cannot be acquired. For example, the absolute scale can be acquired in a case where a known size (distance and the like between two points) of the subject can be specified.

In the image generation apparatus according to still another aspect of the present invention, it is preferable that the composite image generation part performs the composition by projecting each telephoto image of the telephoto image group to an imaging direction of the imaging apparatus from the position of the imaging apparatus according to the angle of view ratio. For example, by projecting (projectively transforming) each telephoto image to a predetermined projection plane in the imaging direction of the imaging apparatus from the position of the imaging apparatus according to the angle of view ratio, a layout position of each image of the telephoto image group is decided, and a high detail composite image of the telephoto images is acquired.

In the image generation apparatus according to still another aspect of the present invention, it is preferable that the composition information acquisition part analyzes the acquired wide angle image group and estimates the position and an attitude of the imaging apparatus at a time of capturing each wide angle image of the wide angle image group and a solid shape of the subject as the composition information, and the composite image generation part composites the telephoto image group based on the position and the attitude of the imaging apparatus, the solid shape of the subject, and the information related to the focal lengths of the wide angle optical system and the telephoto optical system.

In the image generation apparatus according to still another aspect of the present invention, it is preferable that the composition information acquisition part extracts a plurality of feature points in a region in which each wide angle image of the wide angle image group overlaps, and estimates three-dimensional positions of the extracted plurality of feature points as the solid shape of the subject, and the composite image generation part generates the image in which the telephoto image group is composited by mapping a texture corresponding to the telephoto image group to a three-dimensional model surface of the subject including the three-dimensional positions of the plurality of feature points. Accordingly, a detail image of the subject seen from any direction can be generated, and the solid shape of the subject can be accurately recognized.

In the image generation apparatus according to still another aspect of the present invention, it is preferable that the composition information acquisition part estimates the position and an attitude of the imaging apparatus at a time of capturing each wide angle image of the wide angle image group and a solid shape of the subject using a structure from motion method or a simultaneous localization and mapping method.

An image generation system according to still another aspect of the present invention comprises an imaging apparatus including an imaging optical system that includes a wide angle optical system and a telephoto optical system having a common optical axis, a directional sensor that includes a plurality of pixels which are configured with two-dimensionally arranged photoelectric conversion elements and selectively receive each of luminous fluxes incident through the wide angle optical system and the telephoto optical system by pupil separation, and an image reading part that acquires a wide angle image received through the wide angle optical system and a telephoto image received through the telephoto optical system at the same time from the directional sensor; and the image generation apparatus. The image acquisition part acquires the wide angle image group and the telephoto image group by acquiring the wide angle image and the telephoto image that are captured while changing the position of the imaging apparatus and are read by the image reading part.

According to still another aspect of the present invention, by performing imaging using the imaging apparatus having the above configuration while changing the position of the imaging apparatus, the wide angle image group and the telephoto image group captured at the same time by the wide angle optical system and the telephoto optical system having the common optical axis can be acquired. The acquired wide angle image group can be analyzed, and the composition information to be used for compositing the telephoto image group can be acquired. The image in which the telephoto image group is composited based on the acquired composition information, the information related to the focal lengths of the wide angle optical system and the telephoto optical system, and the telephoto image group can be generated.

In the image generation system according to still another aspect of the present invention, it is preferable that one optical system of the wide angle optical system and the telephoto optical system of the imaging optical system is a central optical system having a circular shape, and the other optical system is an annular optical system that is concentrically arranged with respect to the central optical system. Parallax does not occur between two images captured by the central optical system having the circular shape and the annular optical system concentrically arranged with respect to the central optical system. In addition, each of the central optical system and the annular optical system has a rotationally symmetric shape and thus, is preferable as the imaging optical system.

It is preferable that the image generation system according to still another aspect of the present invention further comprises a focal point adjusting part that adjusts a focal point of the telephoto optical system. The telephoto optical system has a shallower depth of field than the wide angle optical system and is easily blurred. Thus, it is preferable to adjust the focal point of the telephoto optical system. The focal point adjusting part may also be disposed in the wide angle optical system. Alternatively, pan-focus may be applied to the wide angle optical system without disposing the focal point adjusting part in the wide angle optical system.

It is preferable that the image generation system according to still another aspect of the present invention further comprises a moving object on which the imaging apparatus is mounted. The reason is that a plurality of image groups having different parallax are acquired by appropriately moving the imaging apparatus.

In the image generation system according to still another aspect of the present invention, it is preferable that the moving object is an aerial vehicle or an artificial satellite. The aerial vehicle or the artificial satellite on which the imaging apparatus is mounted is appropriate for imaging the subject in a wide range.

An image generation method according to still another aspect of the present invention comprises a step of acquiring a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group; a step of analyzing the acquired wide angle image group and a step of acquiring composition information to be used for compositing the telephoto image group; and a step of generating an image in which the telephoto image group is composited based on the composition information, information related to focal lengths of the wide angle optical system and the telephoto optical system, and the telephoto image group.

In the image generation method according to still another aspect of the present invention, it is preferable that in the step of acquiring the composition information, the acquired wide angle image group is analyzed, and the position and an attitude of the imaging apparatus at a time of capturing each wide angle image of the wide angle image group are estimated as the composition information, and in the step of generating the image, the telephoto image group is composited based on the position and the attitude of the imaging apparatus and an angle of view ratio between the wide angle optical system and the telephoto optical system.

In the image generation method according to still another aspect of the present invention, it is preferable that in the step of generating the image, the composition is performed by projecting each telephoto image of the telephoto image group to an imaging direction of the imaging apparatus from the position of the imaging apparatus according to the angle of view ratio.

In the image generation method according to still another aspect of the present invention, it is preferable that in the step of acquiring the composition information, the acquired wide angle image group is analyzed, and the position and an attitude of the imaging apparatus at a time of capturing each wide angle image of the wide angle image group and a solid shape of the subject are estimated as the composition information, and in the step of generating the image, the telephoto image group is composited based on the position and the attitude of the imaging apparatus, the solid shape of the subject, and the information related to the focal lengths of the wide angle optical system and the telephoto optical system.

In the image generation method according to still another aspect of the present invention, it is preferable that in the step of acquiring the composition information, a plurality of feature points in a region in which each wide angle image of the wide angle image group overlaps are extracted, and three-dimensional positions of the extracted plurality of feature points are estimated as the solid shape of the subject, and in the step of generating the image, the image in which the telephoto image group is composited by mapping a texture corresponding to the telephoto image group to a three-dimensional model surface of the subject including the three-dimensional positions of the plurality of feature points is generated.

A non-transitory computer readable recording medium storing an image generation program according to still another aspect of the present invention causes a computer to implement a function of acquiring a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group; a function of analyzing the acquired wide angle image group and acquiring composition information to be used for compositing the telephoto image group; and a function of generating an image in which the telephoto image group is composited based on the composition information, information related to focal lengths of the wide angle optical system and the telephoto optical system, and the telephoto image group.

A hardware structure of each processing part of the image acquisition part, the composition information acquisition part, and the composite image generation part of the image generation apparatus according to the present invention corresponds to various processors below. The various processors include a central processing unit (CPU) that is a general-purpose processor functioning as various processing parts by executing software (program), a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute a specific process, and the like.

One processing part may be configured with one of the various processors or may be configured with two or more processors of the same type or different types (for example, a plurality of FPGAs or a combination of the CPU and the FPGA). In addition, a plurality of processing parts may be configured with one processor. A first form of configuring a plurality of processing parts with one processor is such that one processor is configured with a combination of one or more CPUs and software, and the processor functions as a plurality of processing parts. A second form is such that a processor that implements the function of the whole system including the plurality of processing parts using one integrated circuit (IC) chip is used, as represented by a system on chip (SoC) or the like. Accordingly, various processing parts are configured using one or more of the various processors as a hardware structure. Furthermore, the hardware structure of the various processors is more specifically an electric circuit (circuitry) in which circuit elements such as semiconductor elements are combined.

According to the present invention, the telephoto image group can be favorably composited even in a case where the overlapping region between the images of the telephoto image group is small. Accordingly, the number of times of capturing the telephoto image group can be significantly decreased, and a high resolution composite image can be generated.

BRIEF DESCRIPTION OF THE DRAWINGS

FIG. 1 is an exterior view illustrating an imaging apparatus and an unmanned aerial vehicle constituting an image generation system according to an embodiment of the present invention.

FIG. 19 is a diagram illustrating a relationship among a world coordinate system, a local coordinate system, and an image coordinate system.

DESCRIPTION OF THE PREFERRED EMBODIMENTS

Figure 2:
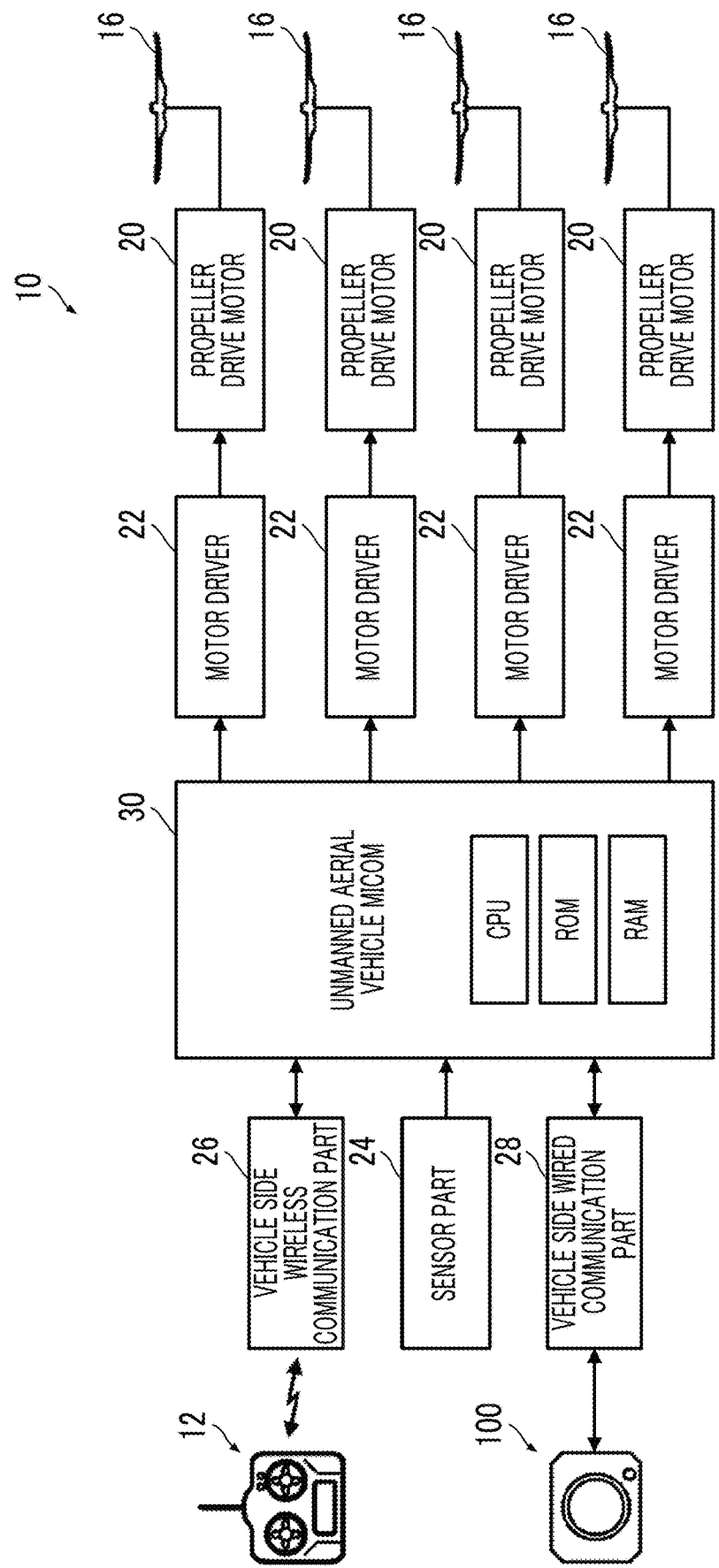
FIG. 2 is a block diagram illustrating an electric configuration of the unmanned aerial vehicle.

Hereinafter, an image generation apparatus, an image generation system, an image generation method, and an image generation program according to a preferred embodiment of the present invention will be described in accordance with the appended drawings.

The image generation system according to the embodiment of the present invention is mainly configured with an imaging apparatus, an image generation apparatus, and an unmanned aerial vehicle.

First Embodiment of Imaging Apparatus

<Apparatus Configuration of Imaging Apparatus>

FIG. 1 is an exterior view illustrating an imaging apparatus 100 and an unmanned aerial vehicle 10 constituting an image generation system 1 according to the embodiment of the present invention.

<Unmanned Aerial Vehicle>

The unmanned aerial vehicle 10 is one example of a moving object. The unmanned aerial vehicle 10 is a so-called drone and flies in the air based on an operation performed by a controller 12.

<Exterior Configuration of Unmanned Aerial Vehicle>

As illustrated in FIG. 1, the unmanned aerial vehicle 10 is configured to comprise a plurality of flying propellers 16 in a main body frame 14.

The main body frame 14 is configured to comprise a torso portion 14A, four arm portions 14B (only two are illustrated in FIG. 1) radially extending from the torso portion 14A, and four leg portions 14C (only two are illustrated in FIG. 1) radially extending from the torso portion 14A.

The propeller 16 is comprised at the distal end of each arm portion 14B. Accordingly, four propellers 16 are comprised in the unmanned aerial vehicle 10 of the present embodiment (only two are illustrated in FIG. 1).

The unmanned aerial vehicle 10 flies in the air by buoyant force generated by rotating the propellers 16. For example, the unmanned aerial vehicle 10 performs upward movement, downward movement, direction change, and the like by individually controlling the rotation of each propeller 16. In addition, a flight speed is controlled by individually controlling the rotation of each propeller 16.

<Electric Configuration of Unmanned Aerial Vehicle>

FIG. 2 is a block diagram illustrating an electric configuration of the unmanned aerial vehicle.

The unmanned aerial vehicle 10 comprises a propeller drive motor 20, a motor driver 22, a sensor part 24, a vehicle side wireless communication part 26, a vehicle side wired communication part 28, and an unmanned aerial vehicle micom (micom: microcomputer) 30.

The propeller drive motor 20 is rotation drive means of the propeller 16. The propeller drive motor 20 is comprised for each propeller 16. Driving of each propeller drive motor 20 is individually controlled by the motor driver 22. Each motor driver 22 controls the driving of the propeller drive motor 20 in response to an instruction from the unmanned aerial vehicle micom 30.

The sensor part 24 detects a flight state of the vehicle. The sensor part 24 is configured to comprise various sensors such as a gyro sensor, a geomagnetic sensor, an acceleration sensor, a speed sensor, an altitude sensor, and a global positioning system (GPS). The sensor part 24 outputs information of the flight state of the vehicle detected by various sensors to the unmanned aerial vehicle micom 30.

The vehicle side wireless communication part 26 wirelessly communicates with the controller 12 and transmits and receives various signals with the controller 12 under control of the unmanned aerial vehicle micom 30. For example, in a case where the controller 12 is operated, a control signal based on the operation is transmitted to the unmanned aerial vehicle 10 from the controller 12. The vehicle side wireless communication part 26 receives the control signal transmitted from the controller 12 and outputs the control signal to the unmanned aerial vehicle 10. The method of communication is not particularly limited. A generally used communication method (for example, a communication method based on a wireless local area network (LAN) standard, a communication method based on a specific power saving wireless standard, and a communication method using a mobile phone network) is used.

The vehicle side wired communication part 28 communicates with the imaging apparatus 100 in a wired manner and transmits and receives various signals with the imaging apparatus 100 under control of the unmanned aerial vehicle micom 30. The method of communication is not particularly limited. A generally used communication method (for example, a communication method based on a Universal Serial Bus (USB) standard) is used.

The unmanned aerial vehicle micom 30 is a control part that controls the operation of the whole unmanned aerial vehicle 10. The unmanned aerial vehicle micom 30 comprises a central processing unit (CPU), a read only memory (ROM), and a random access memory (RAM) and implements various functions by executing a predetermined program. The program is stored in the ROM.

Figure 3:
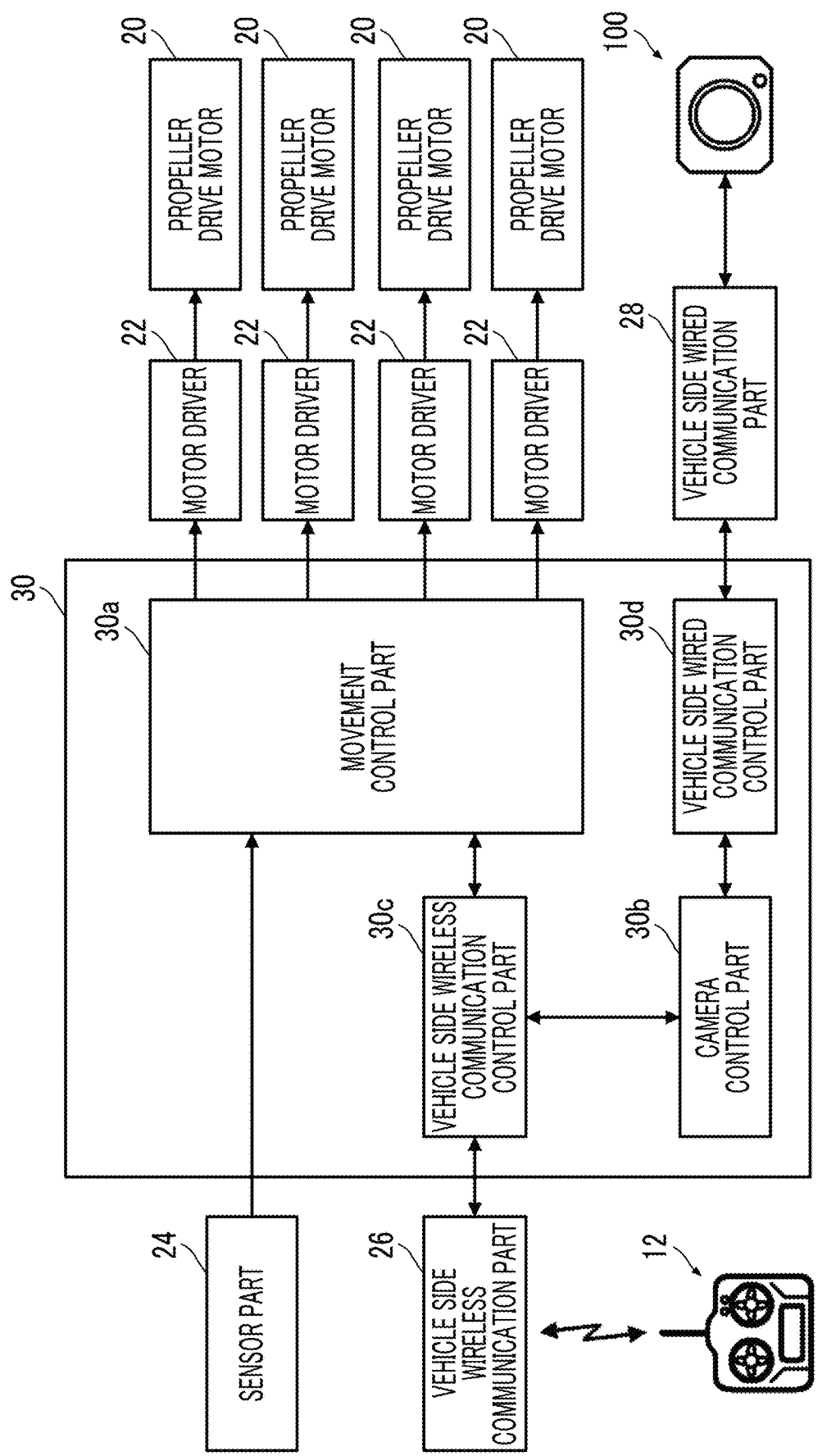
FIG. 3 is a block diagram of main functions implemented by an unmanned aerial vehicle micom.

FIG. 3 is a block diagram of main functions implemented by the unmanned aerial vehicle micom.

The unmanned aerial vehicle micom 30 functions as a movement control part 30a, a camera control part 30b, a vehicle side wireless communication control part 30c, a vehicle side wired communication control part 30d, and the like by executing the predetermined program.

The movement control part 30a controls the flight (movement) of the unmanned aerial vehicle 10 by controlling driving of each propeller drive motor 20 through the motor driver 22. The movement control part 30a controls driving of each propeller drive motor 20 and controls the flight of the unmanned aerial vehicle 10 based on the control signal transmitted from the controller 12 and the information of the flight state of the vehicle output from the sensor part 24. For example, in a case where an upward movement instruction is provided from the controller 12, driving of each propeller drive motor 20 is controlled such that the vehicle moves upward. In a case where a downward movement instruction is provided from the controller 12, driving of each propeller drive motor 20 is controlled such that the vehicle moves downward. In a case where a turning instruction is provided from the controller 12, driving of each propeller drive motor 20 is controlled such that the vehicle turns to a direction of the instruction. During imaging, driving of each propeller drive motor 20 is controlled such that the vehicle flies at a predetermined speed.

The camera control part 30b controls the imaging apparatus 100 based on the control signal transmitted from the controller 12. For example, the imaging apparatus 100 starts imaging in response to an imaging start instruction from the controller 12. The imaging apparatus 100 finishes imaging in response to an imaging finish instruction from the controller 12.

The vehicle side wireless communication control part 30c controls communication with the controller 12 through the vehicle side wireless communication part 26.

The vehicle side wired communication control part 30d controls communication with the imaging apparatus 100 through the vehicle side wired communication part 28.

<Configuration of Controller>

Figure 4:
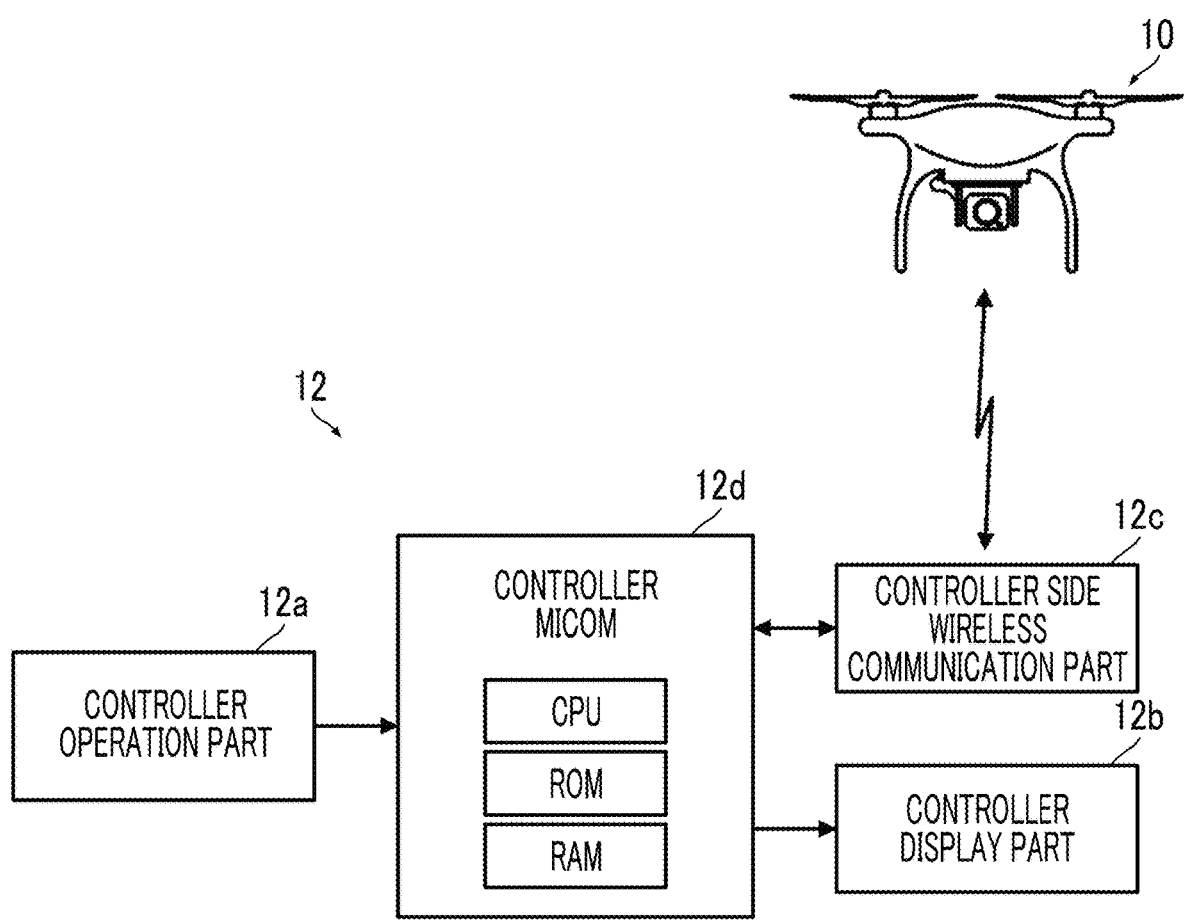
FIG. 4 is a block diagram illustrating an electric configuration of a controller.

FIG. 4 is a block diagram illustrating an electric configuration of the controller.

The controller 12 comprises a controller operation part 12a, a controller display part 12b, a controller side wireless communication part 12c, and a controller micom 12d.

The controller operation part 12a is configured to comprise various operation members that operate the unmanned aerial vehicle 10 and the imaging apparatus 100. For example, the operation members operating the unmanned aerial vehicle 10 include an operation member providing the upward movement instruction and the downward movement instruction for the unmanned aerial vehicle 10, and an operation member providing the turning instruction for the unmanned aerial vehicle 10. For example, the operation members operating the imaging apparatus 100 include an operation member providing the imaging start instruction and the imaging finish instruction.

For example, the controller display part 12b is configured with a liquid crystal display (LCD). For example, the information of the flight state of the unmanned aerial vehicle 10 is displayed on the controller display part 12b.

The controller side wireless communication part 12c wirelessly communicates with the unmanned aerial vehicle 10 and transmits and receives various signals with the unmanned aerial vehicle 10 under control of the controller micom 12d.

The controller micom 12d is a control part that controls the operation of the whole controller 12. The unmanned aerial vehicle micom 30 comprises a CPU, a ROM, and a RAM and implements various functions by executing a predetermined program. For example, in a case where the controller operation part 12a is operated, the controller micom 12d generates a control signal corresponding to the operation and transmits the control signal to the unmanned aerial vehicle 10 through the controller side wireless communication part 12c. In addition, for example, the controller micom 12d acquires the information of the flight state from the unmanned aerial vehicle 10 through the controller side wireless communication part 12c and displays the information of the flight state on the controller display part 12b. The program is stored in the ROM.

<Imaging Apparatus>

Figure 5:
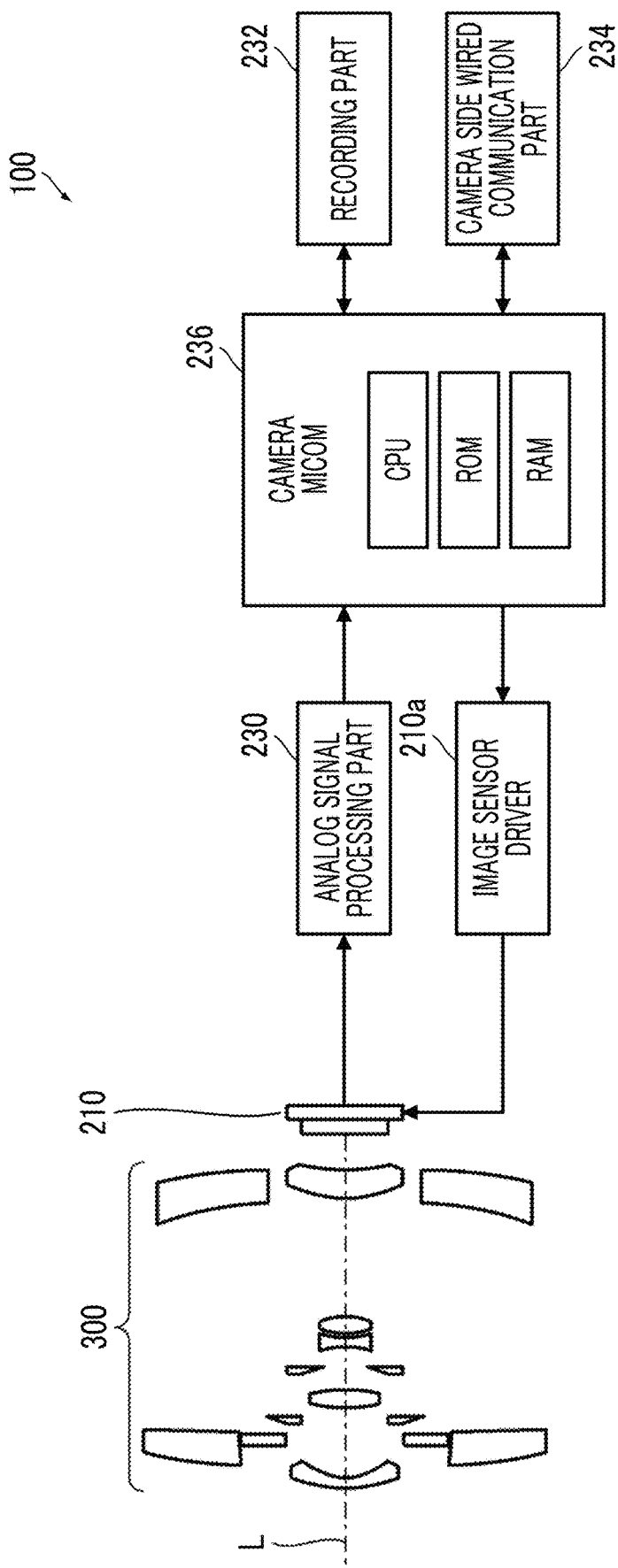
FIG. 5 is a block diagram illustrating a schematic configuration of the imaging apparatus according to the embodiment of the present invention.

FIG. 5 is a block diagram illustrating a schematic configuration of the imaging apparatus 100 according to the embodiment of the present invention.

The imaging apparatus 100 is configured with a single lens camera. The imaging apparatus 100 is mounted on the unmanned aerial vehicle 10 through a tripod head. An imaging direction is adjusted using the tripod head.

The imaging apparatus 100 continuously images a motion picture in response to an imaging instruction from the controller 12. The imaging apparatus 100 is not limited to a motion picture and may sequentially image still pictures.

As illustrated in FIG. 5, the imaging apparatus 100 is configured to comprise an imaging lens 300, an image sensor 210, an analog signal processing part 230, a recording part 232, a camera side wired communication part 234, a camera micom 236, and the like.

<Imaging Lens>

Figure 6:
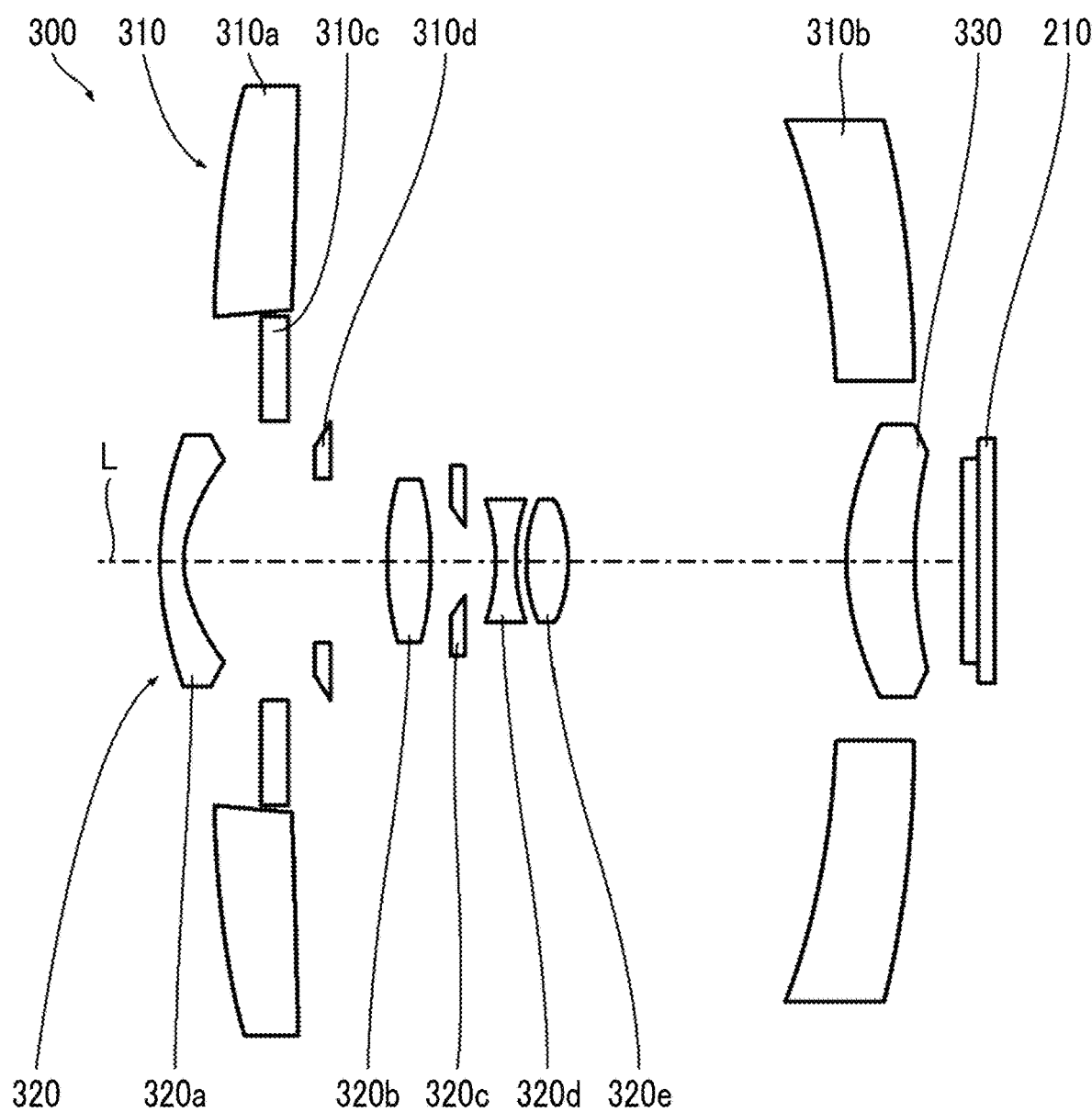
FIG. 6 is a schematic configuration diagram of an imaging lens.

FIG. 6 is a schematic configuration diagram of the imaging lens.

As illustrated in FIG. 6, the imaging lens 300 that functions as an imaging optical system includes two optical systems (a telephoto optical system 310 and a wide angle optical system 320) for capturing two images of different angles of view at the same time. The telephoto optical system 310 and the wide angle optical system 320 have the same optical axis L for performing imaging on the same axis. Particularly, in the imaging lens 300 of the present embodiment, the telephoto optical system 310 and the wide angle optical system 320 are concentrically arranged. In addition, the telephoto optical system 310 and the wide angle optical system 320 have different focal lengths for capturing images of different angles of view. The wide angle optical system 320 is a central optical system having a circular shape. The telephoto optical system 310 is an annular optical system that is concentrically arranged with respect to the central optical system.

<Telephoto Optical System>

The telephoto optical system 310 of the present embodiment is configured with a reflecting telephoto type optical system.

As illustrated in FIG. 6, the telephoto optical system 310 is configured by arranging a first lens 310a, a first mirror 310b, a second mirror 310c, a stop 310d, and a common lens 330 in this order from the subject side. Each of the first lens 310a, the first mirror 310b, the second mirror 310c, and the stop 310d has a ring shape.

The first mirror 310b constitutes a primary mirror of the reflecting telephoto optical system and reflects light passing through the first lens 310a to the second mirror 310c.

The second mirror 310c constitutes a secondary mirror of the reflecting telephoto optical system and reflects light reflected by the first mirror 310b to the common lens 330.

The stop 310d adjusts the intensity of light incident on the common lens 330 from the second mirror 310c. The stop 310d is configured by combining a plurality of stop leaf blades in a ring shape and adjusts the intensity of light by increasing or decreasing the outer diameter of the ring shape.

The common lens 330 is the last lens. Light incident on the telephoto optical system 310 exits from the common lens 330 and is incident on the image sensor 210. The common lens 330 is shared with the wide angle optical system 320.

Figure 7:
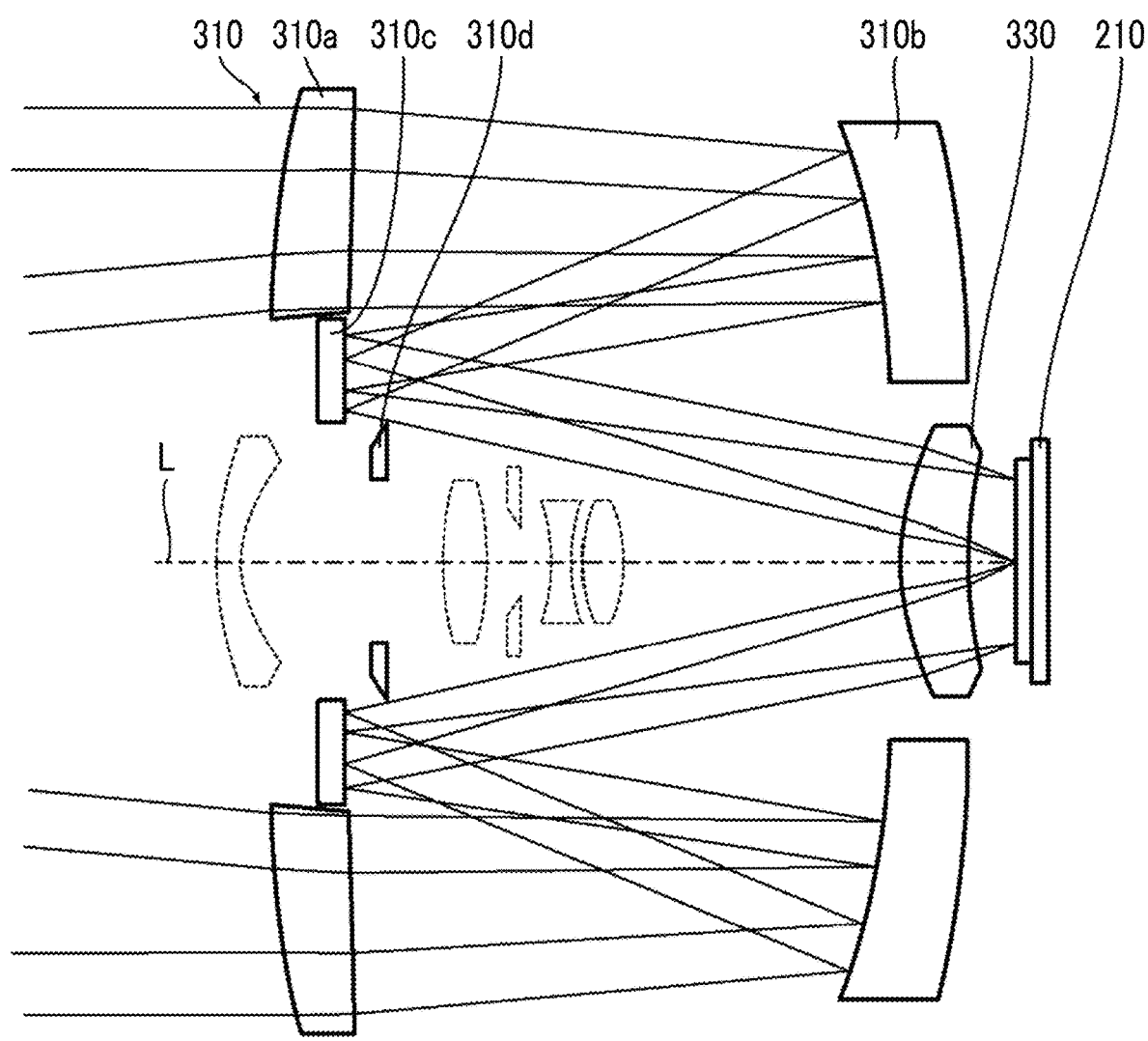
FIG. 7 is a diagram illustrating a ray trajectory of light passing through a telephoto optical system.

FIG. 7 is a diagram illustrating a ray trajectory of light passing through the telephoto optical system.

As illustrated in FIG. 7, light is incident on the image sensor 210 through the first lens 310a, the first mirror 310b, the second mirror 310c, the stop 310d, and the common lens 330.

<Wide Angle Optical System>

The wide angle optical system 320 of the present embodiment is configured with a fixed focal point optical system that enables pan-focus imaging.

As illustrated in FIG. 6, in the wide angle optical system 320, a first lens 320a, a second lens 320b, a stop 320c, a third lens 320d, a fourth lens 320e, and the common lens 330 are arranged in this order from the subject side. Each optical element is arranged on the same axis in the inner circumferential portion of the telephoto optical system 310. Since the wide angle optical system 320 has a fixed focal point, each optical element (including the common lens 330) is fixedly arranged at a constant position. The stop 320c is also configured with a fixed stop and is fixedly arranged at a constant position.

Figure 8:
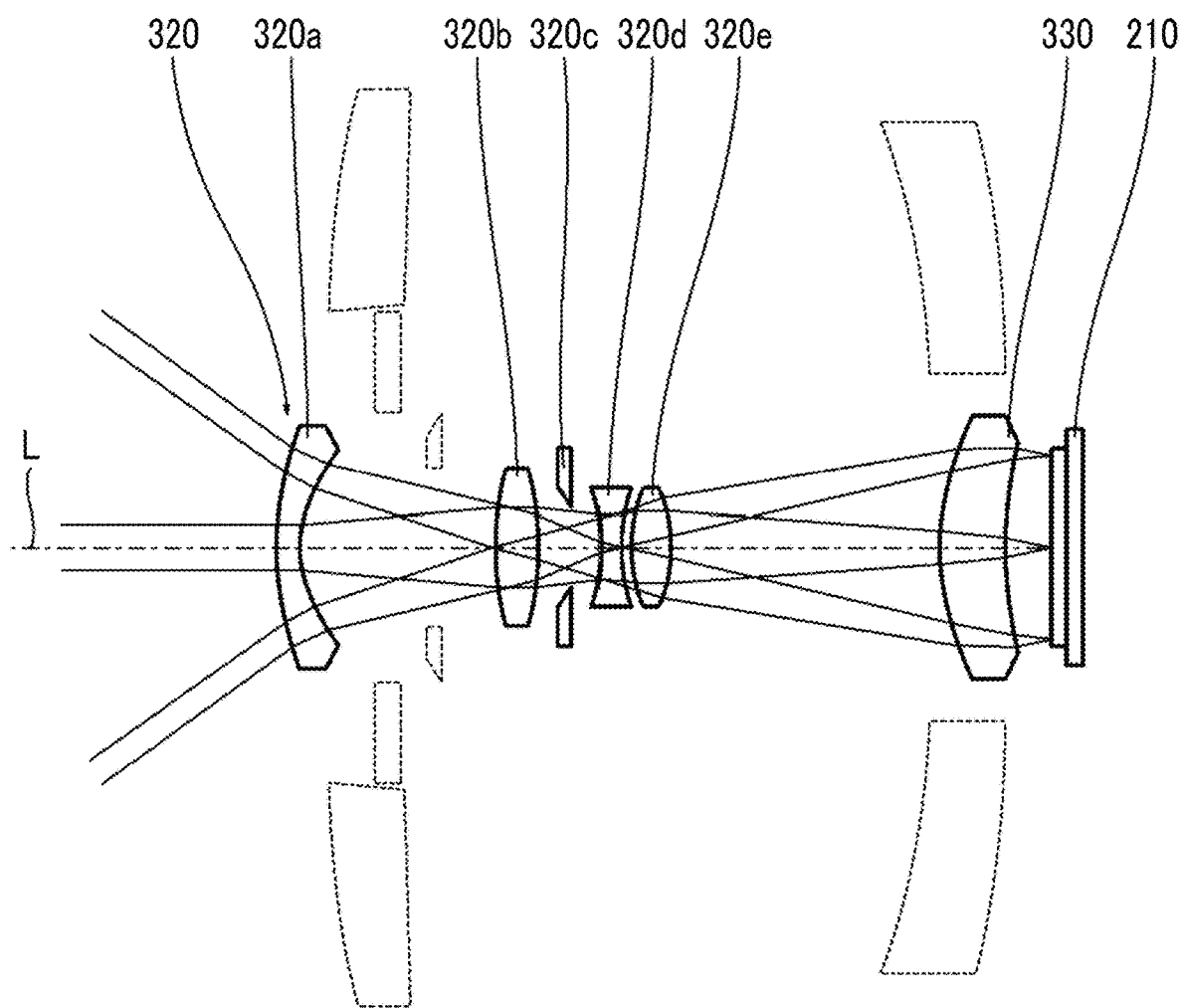
FIG. 8 is a diagram illustrating a ray trajectory of light passing through a wide angle optical system.

FIG. 8 is a diagram illustrating a ray trajectory of light passing through the wide angle optical system 320.

Light is incident on the image sensor 210 through the first lens 320a, the second lens 320b, the stop 320c, the third lens 320d, the fourth lens 320e, and the common lens 330.

<Drive System of Imaging Lens>

Figure 9:
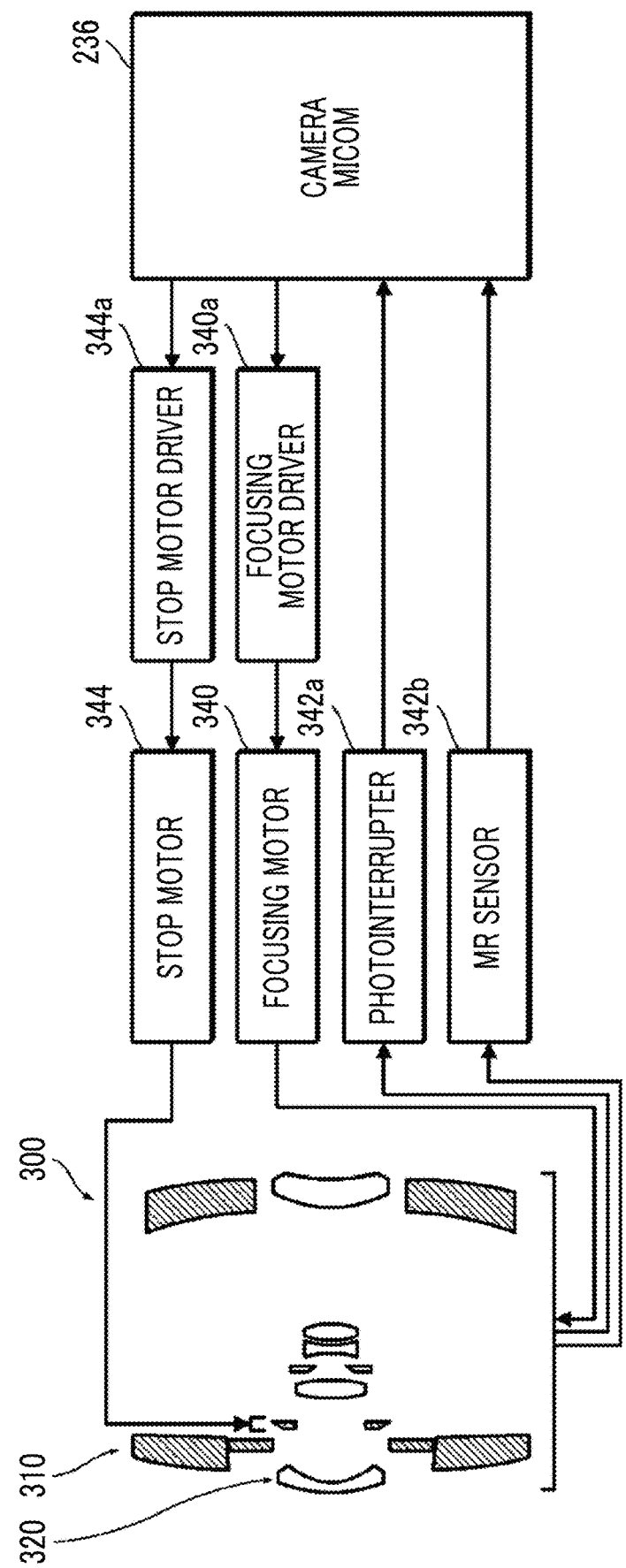
FIG. 9 is a block diagram illustrating a schematic configuration of a drive system of the imaging lens.

FIG. 9 is a block diagram illustrating a schematic configuration of a drive system of the imaging lens 300.

As described above, the wide angle optical system 320 has a fixed focal point and a fixed stop. Thus, the drive system is comprised for only the telephoto optical system 310.

The telephoto optical system 310 comprises a focusing mechanism functioning as a focal point adjusting part that adjusts the focal point of the telephoto optical system 310.

The focusing mechanism displaces a focus position by moving a part of the optical elements of the telephoto optical system 310 forward and rearward along a shaft.

Figure 10A:
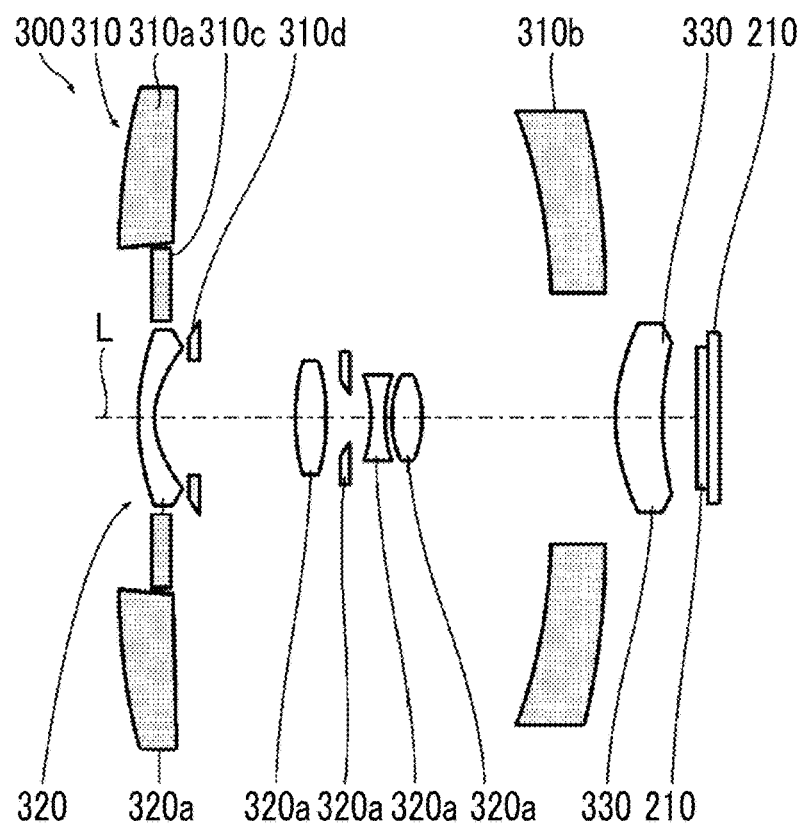
FIGS. 10A and 10B are operation description diagrams of the telephoto optical system driven by a focusing mechanism.
Figure 10B:
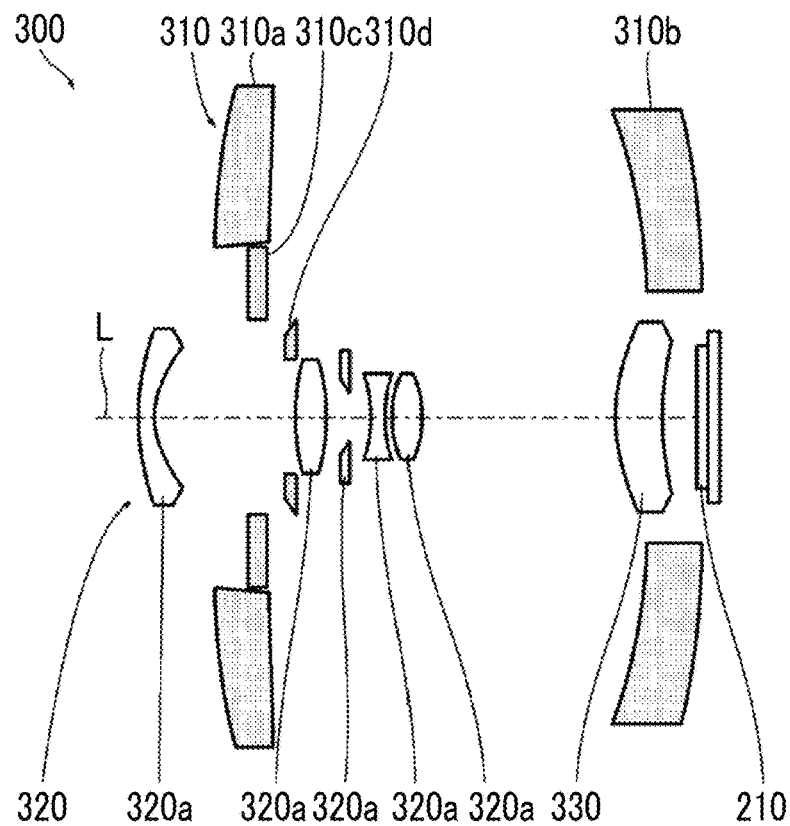

FIGS. 10A and 10B are operation description diagrams of the telephoto optical system driven by the focusing mechanism. FIG. 10A illustrates a state where a movable portion is moved to the subject side. FIG. 10B illustrates a state where the movable portion is moved to an image plane side.

As illustrated in FIG. 9 and FIGS. 10A and 10B, the focusing mechanism displaces the focus position by moving the first lens 310*a*, the first mirror 310*b*, the second mirror 310*c*, and the stop 310*d* constituting the telephoto optical system 310 together.

The focusing mechanism is configured to comprise a support part (not illustrated) that supports the first lens 310*a*, the first mirror 310*b*, the second mirror 310*c*, and the stop 310*d* (hereinafter, referred to as the "movable portion") to be movable together along the shaft, and a focusing motor 340 that moves the movable portion of the telephoto optical system along the shaft. For example, the focusing motor 340 is configured with a linear motor. The camera micom 236 controls driving of the focusing motor 340 through a focusing motor driver 340*a*.

The telephoto optical system 310 comprises a photointerrupter 342*a* and a magneto resistive (MR) sensor 342*b* as means for detecting the position of the movable portion. The photointerrupter 342*a* detects a state where the movable portion is positioned at a predetermined origin. The photointerrupter 342*a* that detects the amount of displacement of the movable portion detects a state where the movable portion is positioned at the origin, and the MR sensor 342*b* detects the amount of displacement from the origin. Thus, the MR sensor 342*b* can detect the position of the movable portion with respect to the origin. The detection results of the photointerrupter 342*a* and the MR sensor 342*b* are output to the camera micom 236. The camera micom 236 detects the position of the movable portion based on the outputs of the photointerrupter 342*a* and the MR sensor 342*b*.

The stop 310*d* is driven by a stop motor 344. The camera micom 236 controls driving of the stop motor 344 through a stop driver 344*a*.

<Image Sensor>

The image sensor 210 is a solid-state imaging element such as a complementary metal oxide semiconductor (CMOS) or a charged coupled device (CCD). Particularly, the image sensor 210 is configured with a directional sensor in which pixels that selectively receive light passing through the telephoto optical system 310 and light passing through the wide angle optical system 320 are two-dimensionally arranged.

Figure 11:
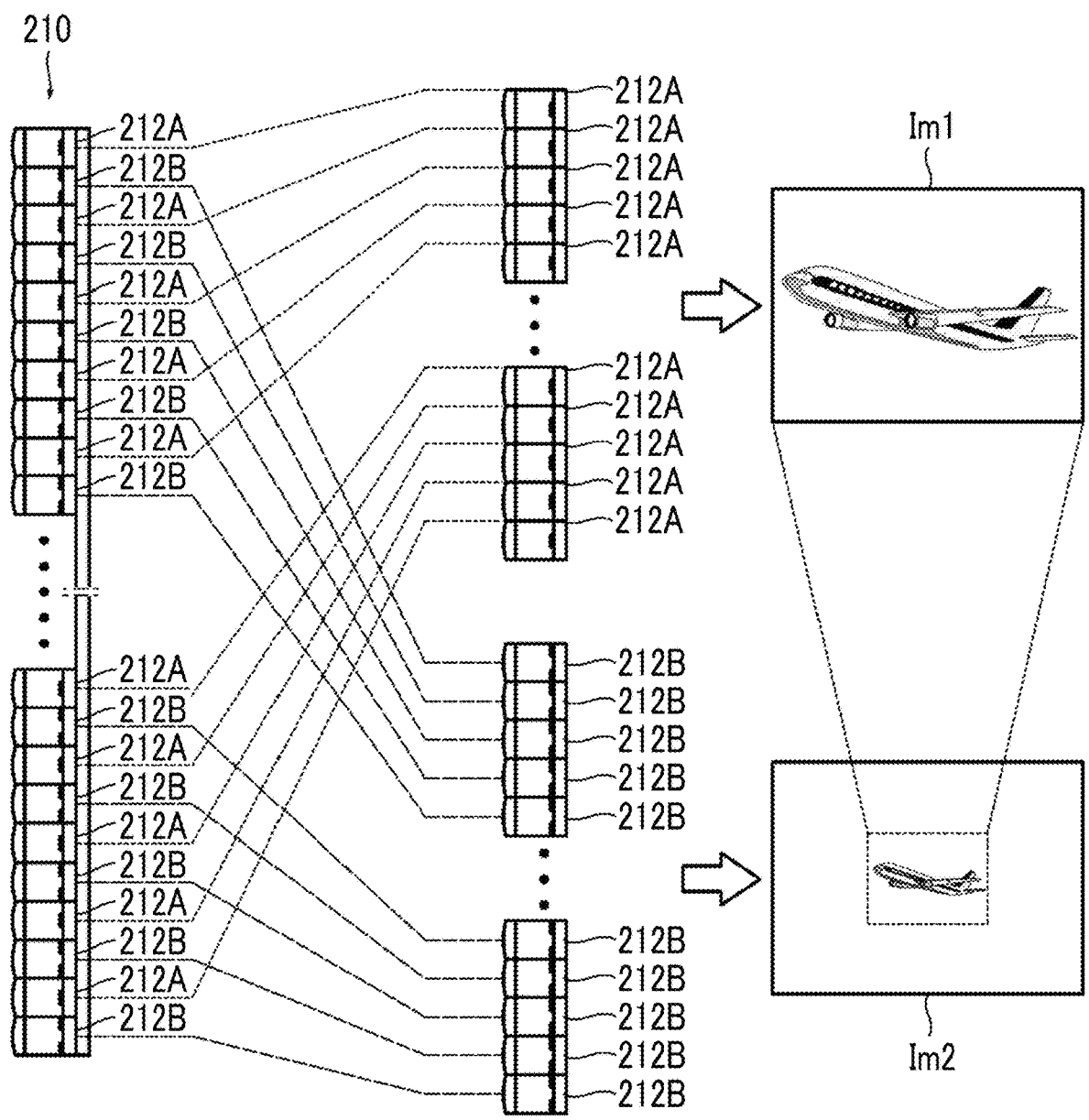
FIG. 11 is a schematic configuration diagram of an image sensor.

FIG. 11 is a schematic configuration diagram of the image sensor 210.

As illustrated in FIG. 11, the image sensor 210 includes a plurality of pixels configured with two-dimensionally arranged photoelectric conversion elements and includes first pixels 212A that selectively receive light passing through the telephoto optical system 310, and second pixels 212B that selectively receive light passing through the wide angle optical system 320. The first pixels 212A and the second pixels 212B are alternately arranged on the same flat surface.

Figure 12:
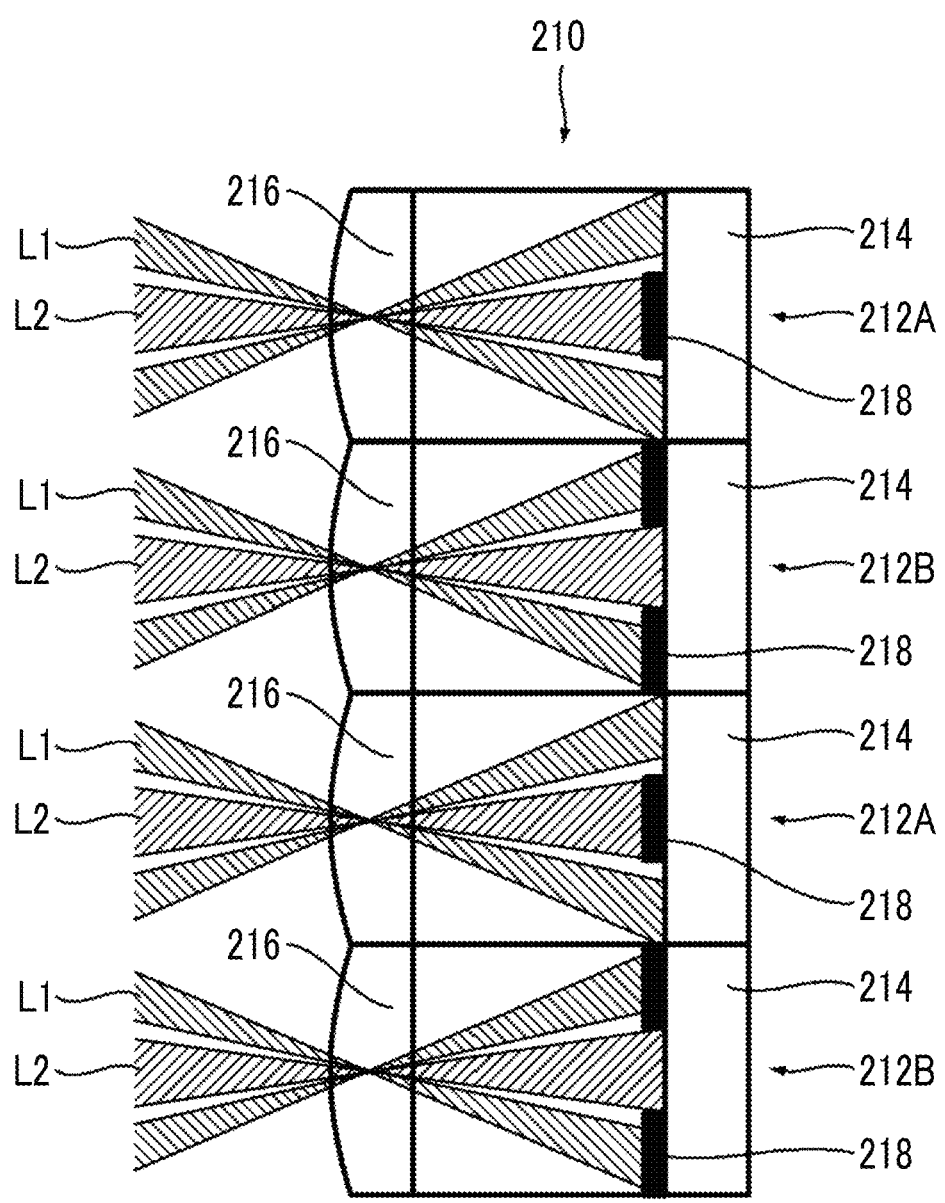
FIG. 12 is a conceptual diagram of a configuration in which each pixel of the image sensor selectively receives light from a corresponding optical system.

FIG. 12 is a conceptual diagram of a configuration in which each pixel of the image sensor 210 selectively receives light from a corresponding optical system.

As illustrated in FIG. 12, each pixel is configured to comprise a photodiode 214, a microlens 216, and a light blocking mask 218. The microlens 216 and the light blocking mask 218 function as pupil separation means for causing each luminous flux passing through the telephoto optical system 310 and the wide angle optical system 320 to be selectively incident on each pixel of the image sensor 210 by pupil separation.

That is, the microlens 216 is arranged in front of the photodiode 214. The microlens 216 forms pupil images of the telephoto optical system 310 and the wide angle optical system 320 in the photodiode 214.

The light blocking mask 218 is arranged between the microlens 216 and the photodiode 214. The light blocking mask 218 blocks a part of light passing through the microlens 216. The light blocking mask 218 of the first pixel 212A has a shape that blocks light L2 passing through the wide angle optical system 320. Specifically, the light blocking mask 218 has a circular shape. The light blocking mask 218 of the second pixel 212B has a shape that blocks light L1 passing through the telephoto optical system 310. Specifically, the light blocking mask 218 has a ring shape.

In the above configuration, the first pixel 212A selectively receives the light L1 passing through the telephoto optical system 310, and the second pixel 212B selectively receives the light L2 passing through the wide angle optical system 320. Accordingly, by acquiring an image signal of the first pixel 212A, an image signal of an image Im1 acquired through the telephoto optical system 310 can be acquired at the same time. By acquiring an image signal of the second pixel 212B, an image signal of an image Im2 acquired through the wide angle optical system 320 can be acquired.

In the imaging lens 300 of the present embodiment, the optical axis of the telephoto optical system 310 is the same as the optical axis of the wide angle optical system 320. Thus, the image Im1 of the telephoto optical system 310 is an image that does not have parallax and is an enlarged central part of the image Im2 of the wide angle optical system 320.

In the case of acquiring a color image, a color filter is comprised in the first pixel 212A and the second pixel 212B. The color filter is arranged in a predetermined arrangement. For example, color filters of three colors including red, green, and blue are arranged in a Bayer arrangement. Accordingly, a color image can be acquired.

<Analog Signal Processing Part>

In FIG. 5, the analog signal processing part 230 acquires an analog image signal of each pixel output from the image sensor 210, performs predetermined signal processing on the analog image signal, then converts the analog image signal into a digital signal, and outputs the digital signal. The digital image signal output from the analog signal processing part 230 is acquired by the camera micom 236.

<Recording Part>

The recording part 232 is a recording part of various data. Captured image data is recorded in the recording part 232. The recording part 232 is configured with a storage device using a non-volatile memory such as a solid state drive (SSD). The imaging apparatus 100 of the present embodiment captures two images (a telephoto image and a wide angle image) at the same time in one imaging. Thus, two images are recorded in one imaging. Specifically, image data captured by the telephoto optical system 310 and image data captured by the wide angle optical system 320 are recorded.

<Camera Side Wired Communication Part>

The camera side wired communication part 234 communicates with the unmanned aerial vehicle 10 in a wired manner and transmits and receives various signals with the unmanned aerial vehicle 10 under control of the camera micom 236.

<Camera Micom>

The camera micom 236 is a control part that controls the operation of the whole imaging apparatus 100. The camera micom 236 comprises a CPU, a ROM, and a RAM and implements various functions by executing a predetermined program. The program is stored in the ROM.

Figure 13:
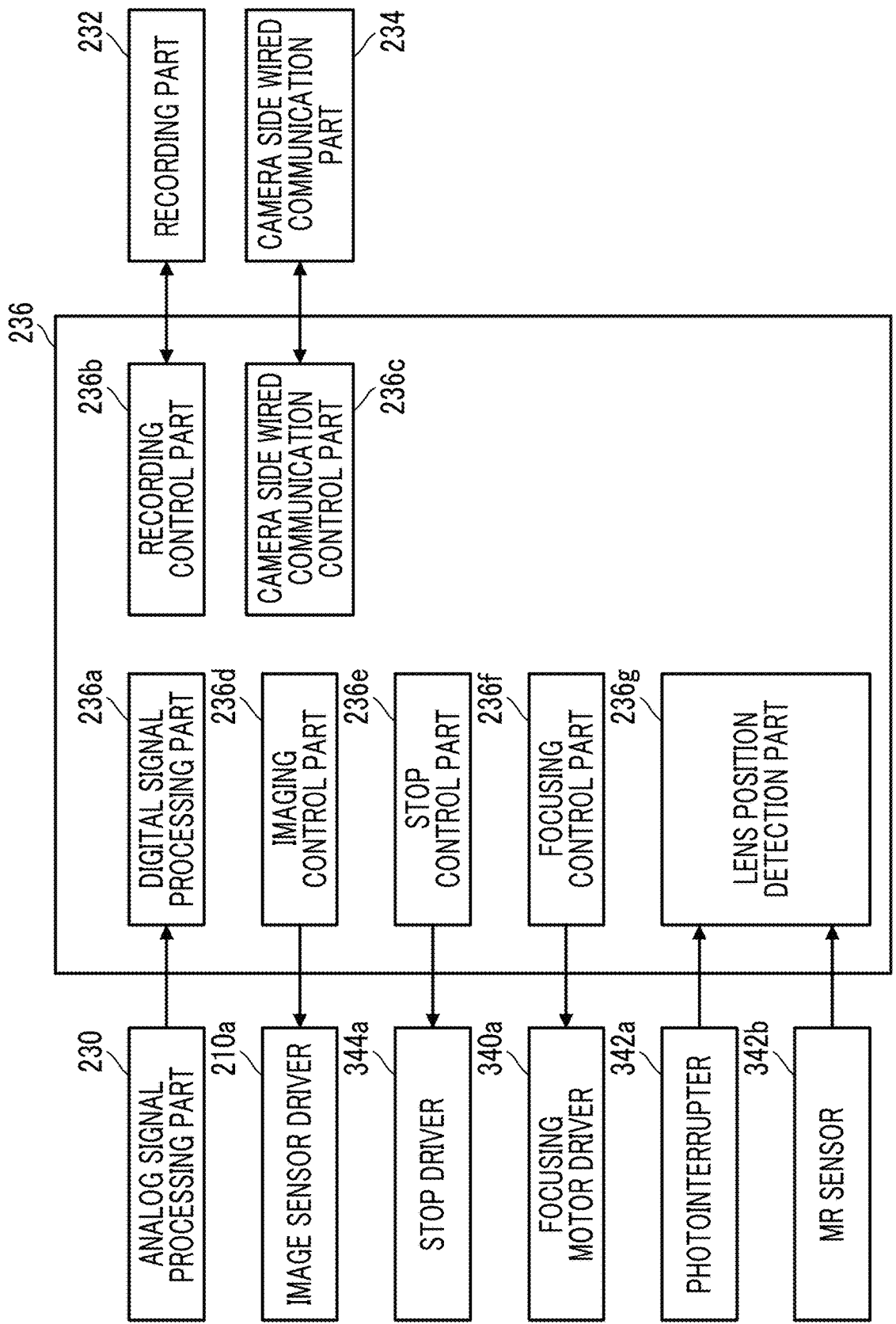
FIG. 13 is a block diagram of main functions implemented by a camera micom.

FIG. 13 is a block diagram of main functions implemented by the camera micom 236.

As illustrated in FIG. 13, the camera micom 236 functions as a digital signal processing part 236a, a recording control part 236b, a camera side wired communication control part 236c, an imaging control part 236d, a stop control part 236e, a focusing control part 236f, a lens position detection part 236g, and the like by executing the predetermined program.

The digital signal processing part 236a acquires the analog image signal output from the analog signal processing part 230 and generates image data by performing predetermined signal processing (for example, color interpolation, color separation, color balance adjustment, gamma correction, and an image highlight process) on the analog image signal. The digital signal processing part 236a generates telephoto image data based on the image signal of the first pixel 212A of the image sensor 210 and generates wide angle image data based on the image signal of the second pixel 212B.

The recording control part 236b controls writing of data into the recording part 232. The image data (the telephoto image data and the wide angle image data) acquired by imaging is recorded in the recording part 232 by the recording control part 236b. In a telephoto image group and a wide angle image group captured as a motion picture (or a plurality of still pictures), the image data of the telephoto image and the wide angle image captured at the same time is stored in association with each other.

The camera side wired communication control part 236c controls communication with the unmanned aerial vehicle 10 through the camera side wired communication part 234.

The imaging control part 236d functioning as an image reading part that acquires image signals indicating the wide angle image and the telephoto image at the same time from the image sensor 210 controls driving of the image sensor 210 through an image sensor driver 210a. More specifically, driving of the image sensor 210 is controlled such that a motion picture is imaged at a predetermined frame rate.

The stop control part 236e controls driving of the stop motor 344 through the stop driver 344a. More specifically, driving of the stop motor 344 is controlled such that the stop 310d has a predetermined F number (opening amount). The F number is set based on a signal acquired from the image sensor 210. That is, the F number is set such that appropriate exposure is performed.

The focusing control part 236f controls driving of the focusing motor 340 through the focusing motor driver 340a.

[Effect of Imaging Apparatus]

<Basic Operation>

<Basic Operation of Unmanned Aerial Vehicle>

The unmanned aerial vehicle 10 flies in the air based on the operation of the controller 12. Specifically, the unmanned aerial vehicle 10 moves upward in response to the upward movement instruction and moves downward in response to the downward movement instruction from the controller 12. In addition, the unmanned aerial vehicle 10 turns to the direction of the instruction in response to the turning instruction.

<Basic Operation of Imaging Apparatus>

The imaging apparatus 100 also performs imaging based on the operation of the controller 12. That is, imaging of a motion picture is started in response to the imaging start instruction from the controller 12. Imaging of the motion picture is finished in response to the imaging finish instruction from the controller 12. The motion picture is continuously imaged from the start of imaging until the imaging finish instruction is provided.

The imaging apparatus 100 of the present embodiment captures the telephoto image of the telephoto optical system 310 and the wide angle image of the wide angle optical system 320 at the same time on the same axis. Both images are images not having parallax and are recorded in the recording part 232.

<Operation of Unmanned Aerial Vehicle During Imaging>

Figure 14:
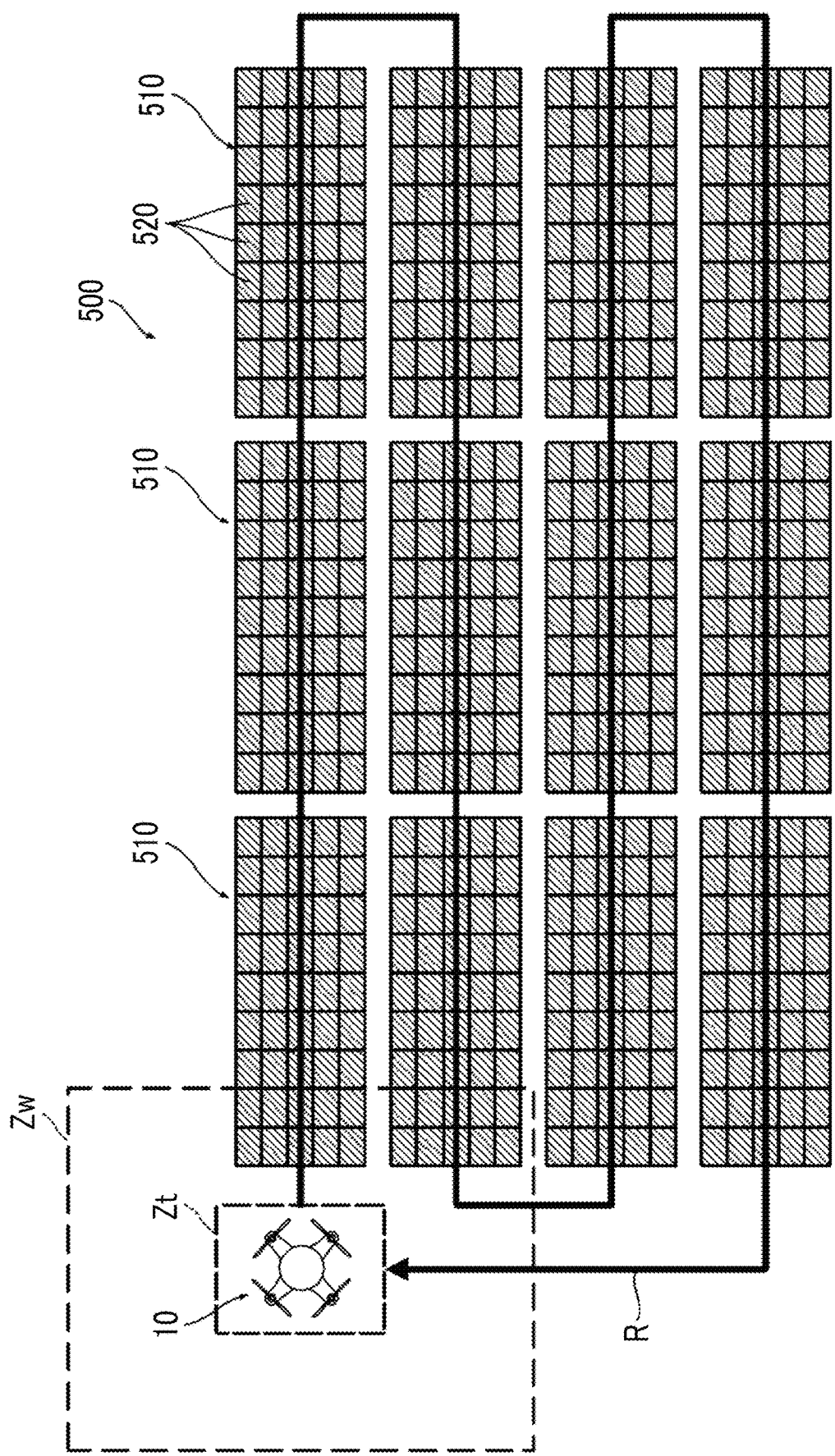
FIG. 14 is a diagram illustrating one example of a subject imaged by the imaging apparatus mounted on the unmanned aerial vehicle and a form of imaging.

FIG. 14 is a diagram illustrating one example of the subject imaged by the imaging apparatus 100 mounted on the unmanned aerial vehicle 10 and the form of imaging.

The subject illustrated in FIG. 14 is a solar power generation facility 500 that is installed on the ground. The imaging apparatus 100 mounted on the unmanned aerial vehicle 10 images the solar power generation facility 500 while moving along a flight route indicated by an arrow R from above by the unmanned aerial vehicle 10. That is, the unmanned aerial vehicle 10 flies such that the imaging apparatus 100 scans the solar power generation facility 500, and images the solar power generation facility 500 from above.

The solar power generation facility 500 is configured by regularly arranging a plurality of solar power generation units 510. One solar power generation unit 510 is configured by regularly arranging a plurality of solar cell modules 520. In the example illustrated in FIG. 14, 45 solar cell modules 520 are arranged in vertically 5 columns and horizontally 9 rows and constitute one solar power generation unit 510.

Figure 15:
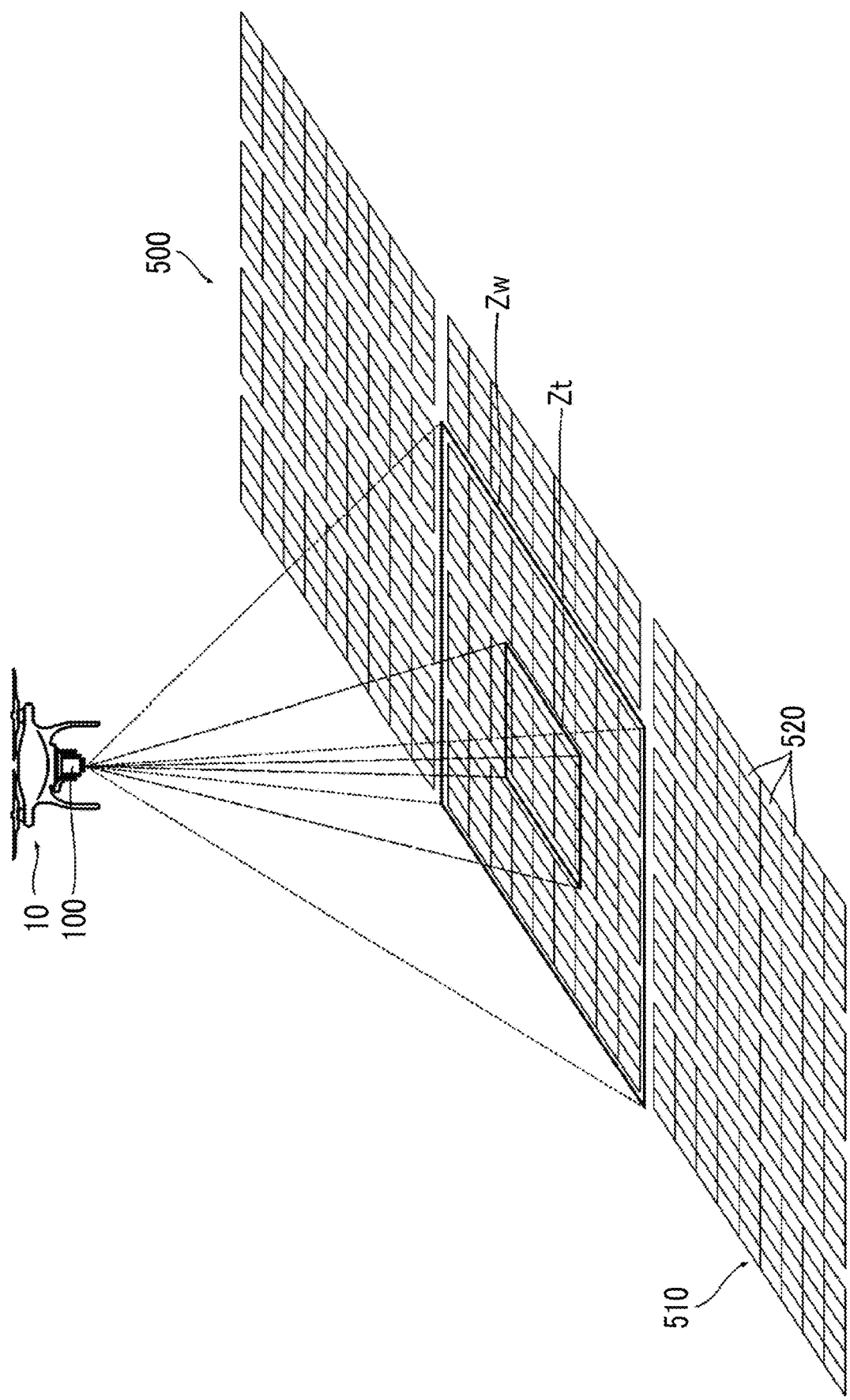
FIG. 15 is a perspective view illustrating a state where a solar power generation part is imaged by the imaging apparatus mounted on the unmanned aerial vehicle.

FIG. 15 is a perspective view illustrating a state where the solar power generation unit 510 is imaged by the imaging apparatus 100 mounted on the unmanned aerial vehicle 10. The imaging range of one imaging through the telephoto optical system 310 is denoted by Zt, and the imaging range of one imaging through the wide angle optical system 320 is denoted by Zw.

In the example illustrated in FIG. 15, the imaging range Zt of one imaging through the telephoto optical system 310 is a range that can cover the length of one solar power generation unit 510 in a short direction. The imaging range Zw of one imaging through the wide angle optical system 320 is a range that can cover the length of three solar power generation units 510 in the short direction.

Figure 16:
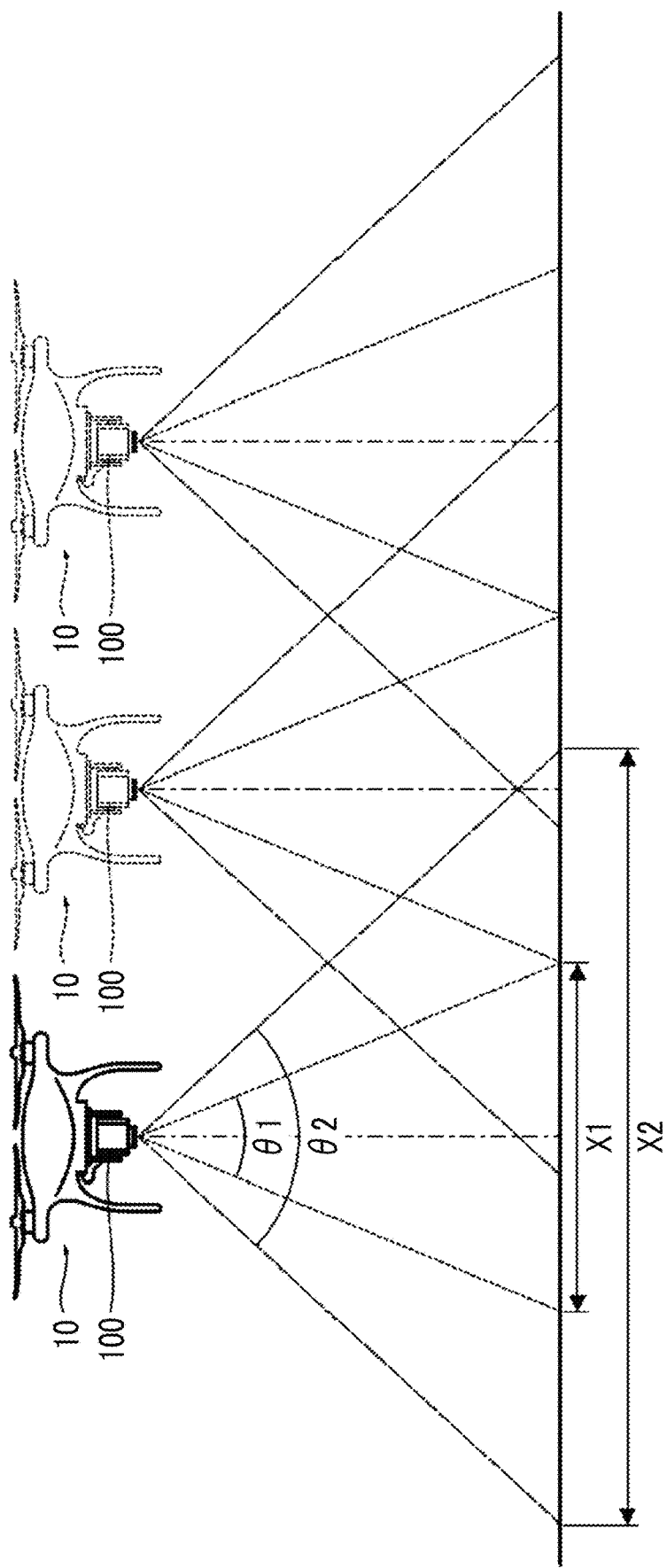
FIG. 16 is a diagram illustrating a state where a wide angle image and a telephoto image are captured while the unmanned aerial vehicle flies at an almost constant altitude.

As illustrated in FIG. 16, the unmanned aerial vehicle 10 flies (including hovering) at an almost constant altitude during imaging. Accordingly, only turning is the operation during imaging.

The unmanned aerial vehicle micom 30 functioning as the movement control part 30a controls each propeller drive motor 20 and flies at an almost constant altitude based on the output from the sensor part 24.

A case of imaging a space immediately below the imaging apparatus 100 from a constant altitude is considered. In this case, a range X1 of an angle θ1 is imaged by the telephoto optical system 310, and a range X2 of an angle θ2 is imaged by the wide angle optical system 320.

In the telephoto image group that is used for compositing the telephoto image described below, the range X1 needs to overlap between the adjacent telephoto images (it is preferable that the range X1 overlaps without a gap). In the wide angle image group, the range X2 needs to sufficiently overlap between the adjacent wide angle images.

<Flight of Unmanned Aerial Vehicle>

The unmanned aerial vehicle 10 may be configured to automatically fly along a predetermined route. In this case, the controller 12 is not necessary. The unmanned aerial vehicle 10 flies along the determined route while performing autonomous control based on information of various sensors. In this case, the flight speed is set under the above condition.

<Imaging by Imaging Apparatus>

In the embodiment, a configuration in which a motion picture is continuously imaged in response to the imaging instruction is used. Alternatively, a configuration in which still pictures are periodically imaged may be used.

<Composition Process for Captured Images>

A plurality of telephoto images (telephoto image group) captured by the telephoto optical system 310 and a plurality of wide angle images (wide angle image group) captured by the wide angle optical system 320 are recorded in the recording part 232.

An image composition process, described below, for the telephoto image group and the wide angle image group may be performed by the image generation apparatus that is incorporated in or connected to the imaging apparatus 100. The image composition process may be performed separately from the imaging apparatus 100 (by a dedicated image generation apparatus).

In the case of performing the image composition process by the imaging apparatus 100, the camera micom 236 implements a function of performing the process. In this case, the camera micom 236 functions as the image generation apparatus by executing an image generation program and executes the process.

In the case of performing the image composition process by the dedicated image generation apparatus, for example, a computer functions as the image generation apparatus. That is, the computer functions as the image generation apparatus by executing the image generation program.

[Image Generation System]

Figure 17:
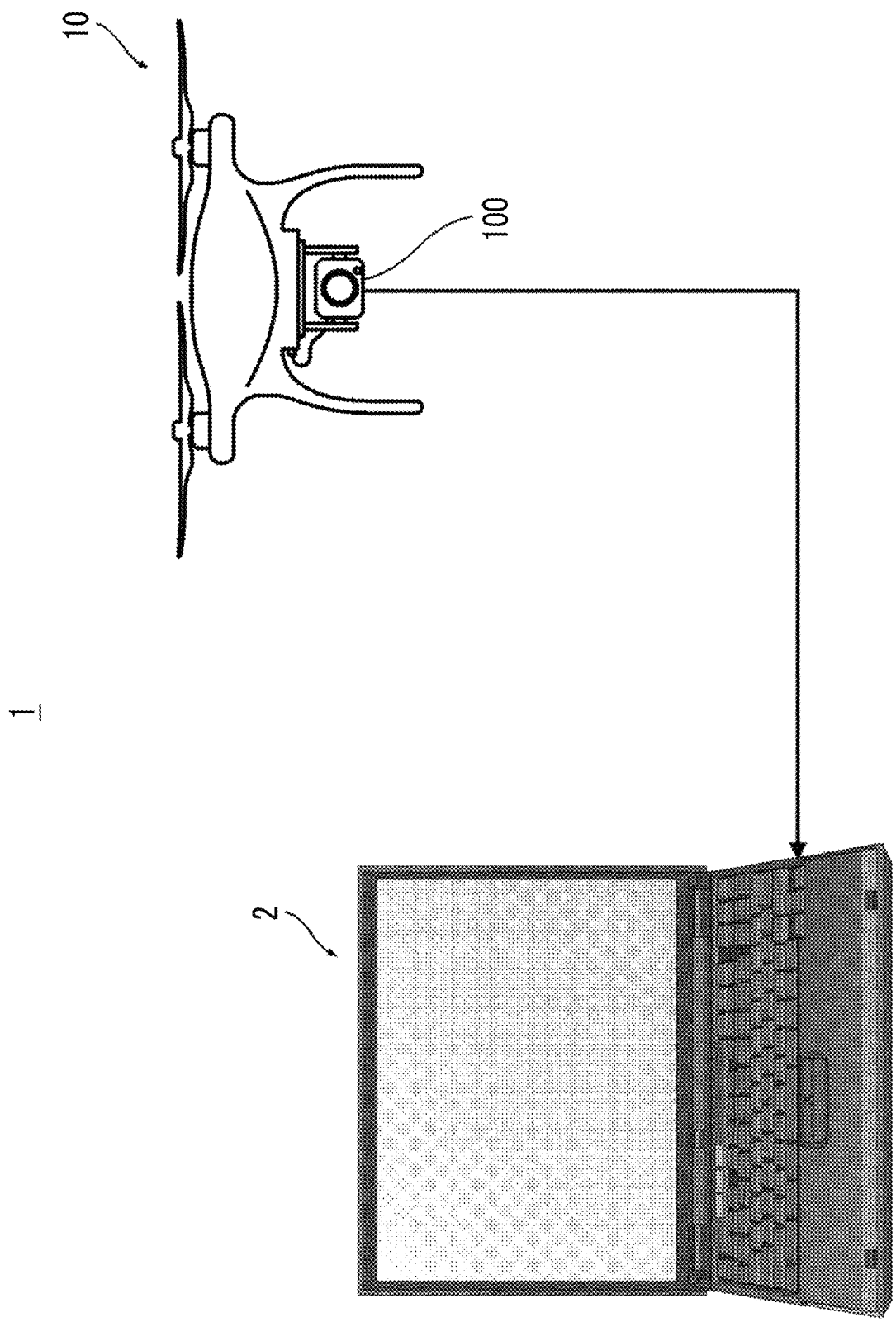
FIG. 17 is a system configuration diagram illustrating the image generation system according to the embodiment of the present invention.

FIG. 17 is a system configuration diagram illustrating the image generation system 1 according to the embodiment of the present invention and is configured with the imaging apparatus 100, the unmanned aerial vehicle 10 on which the imaging apparatus 100 is mounted, and an image generation apparatus 2.

In FIG. 17, the image generation apparatus 2 is configured with a computer comprising a CPU, a ROM, a RAM, and the like. The image generation apparatus 2 acquires the telephoto image group and the wide angle image group captured by the imaging apparatus 100 and generates an image in which the telephoto image group is composited based on the acquired telephoto image group and wide angle image group.

The computer functions as the image generation apparatus 2 by causing the CPU to execute the image generation program stored in the ROM.

<Image Composition Apparatus>

Figure 18:
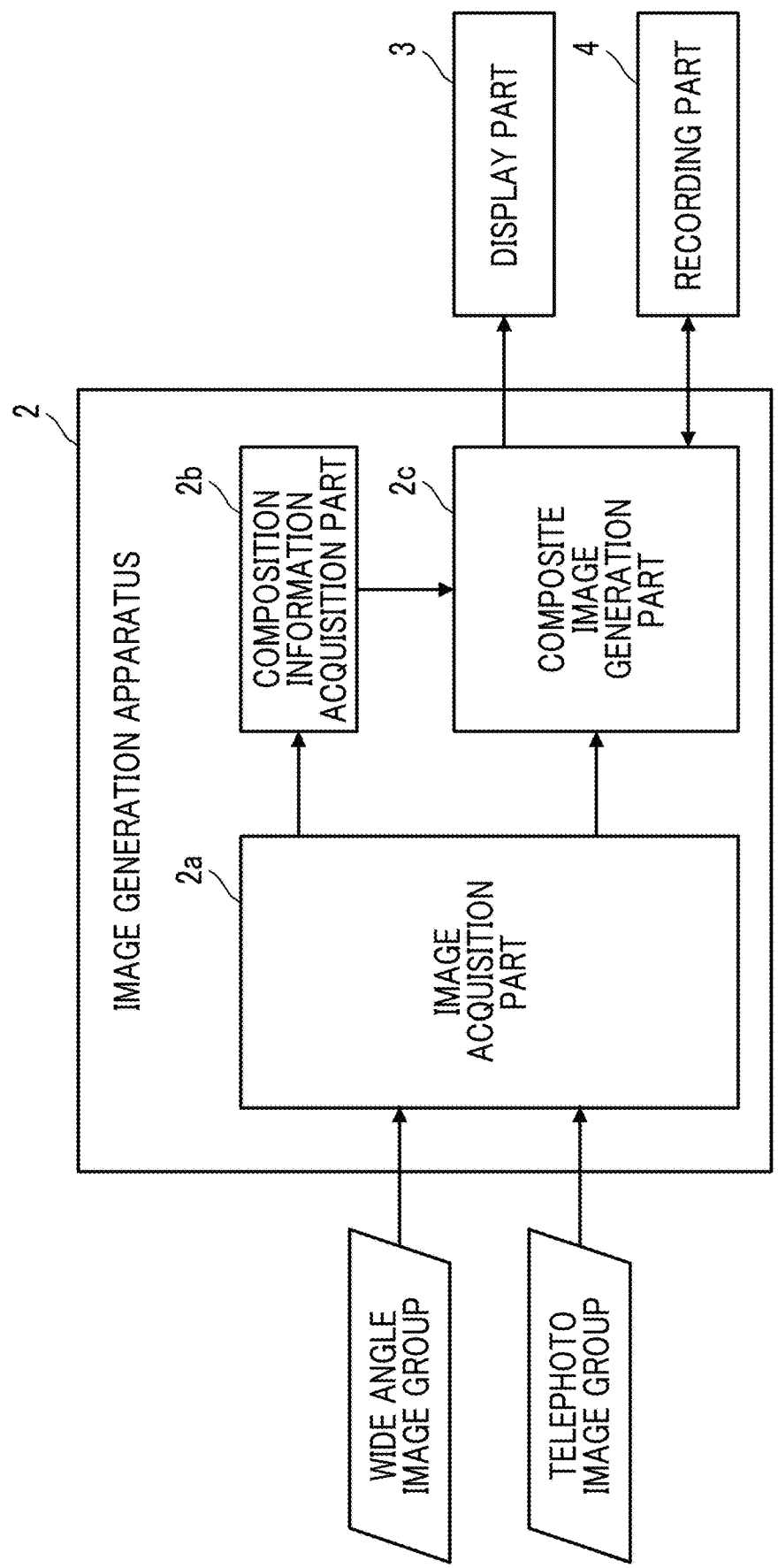
FIG. 18 is a function block diagram illustrating an image composition apparatus according to the embodiment of the present invention.

FIG. 18 is a function block diagram illustrating the image generation apparatus 2 according to the embodiment of the present invention.

As illustrated in FIG. 18, the image generation apparatus 2 is mainly configured with an image acquisition part 2a, a composition information acquisition part 2b, and a composite image generation part 2c.

The image acquisition part 2a acquires the wide angle image group and the telephoto image group captured by the imaging apparatus 100. The image acquisition part 2a may acquire the wide angle image group and the telephoto image group such that wireless communication is performed with the imaging apparatus 100 or the unmanned aerial vehicle 10, and the telephoto images and the wide angle images captured at the same time may be acquired in real time each time one imaging is performed by the imaging apparatus 100. Alternatively, after imaging is finished, the wide angle image group and the telephoto image group may be collectively acquired by wireless communication or wired communication, or through a recording medium.

The composition information acquisition part 2b analyzes the wide angle image group acquired by the image acquisition part 2a and acquires composition information to be used for compositing the telephoto image group.

First Embodiment of Acquisition of Composition Information

The composition information acquisition part 2b analyzes the wide angle image group and estimates the position and the attitude of the imaging apparatus 100 at the time of capturing each wide angle image of the wide angle image group as the composition information.

Specifically, feature points included in a region (overlapping region) in which each wide angle image of the wide angle image group captured while moving the position of the imaging apparatus 100 overlaps are extracted. A correspondence relationship (correspondence points having a matching local feature amount) of the feature points between the wide angle images are specified.

A scale-invariant feature transform (SIFT) feature amount, a speeded-up robust feature (SURF) feature amount, and an accelerated KAZE (AKAZE) feature amount are known as a local feature amount that is robust against enlarging and reduction (difference in imaging distance), rotation, and the like between the wide angle images. It is preferable that the number (number of sets) of correspondence points having a matching feature amount is greater than or equal to a few tens of sets. Accordingly, it is preferable that the overlapping region between the wide angle images is large. In the example illustrated in FIG. 16, the overlapping region between the wide angle images exceed 50% of the whole image.

The position and the attitude of the imaging apparatus 100 are estimated based on a plurality of corresponding feature points between the wide angle images.

<Estimation of Position and Attitude of Imaging Apparatus>

FIG. 19 is a diagram illustrating a relationship among a world coordinate system, a local coordinate system, and an image coordinate system.

The three-dimensional position (three-dimensional shape) of the subject (in the present example, the solar power generation facility including the solar power generation unit 510) can be represented by the world coordinate system of three orthogonal axes X, Y, and Z having an origin O.

The local coordinate system (hereinafter, referred to as a "camera coordinate system") of three orthogonal axes x, y, and z is the coordinate system of the imaging apparatus 100 (camera) that moves independently of the world coordinate system. The origin of the camera coordinate system is the position of the focal point of the camera. The direction of the optical axis of the camera coordinate system is the z axis.

The image coordinate system is a coordinate system representing the two-dimensional position of a point on the image formed in the image sensor 210. Coordinates (u, v) of a feature point c on the image can be acquired from the number of pixels from a reference position of the image sensor 210 and a pixel pitch.

The relationship among the coordinates (u, v) of the feature point c in the image coordinate system, coordinates (X, Y, Z) of the feature point c in the world coordinate system, a matrix C representing camera intrinsic parameters, and a matrix M representing camera extrinsic parameters can be represented by the following expression.

$$c \begin{pmatrix} u \\ v \\ 1 \end{pmatrix} = CM \begin{pmatrix} X \\ Y \\ Z \\ 1 \end{pmatrix}$$ [Expression 1]

The camera intrinsic parameters include the focal length, the image size of the image sensor, the pixel pitch, the position of the image center, and the like and can be acquired in advance by calibration.

The matrix M representing the camera extrinsic parameters is a coordinate transformation matrix from the world coordinates to the camera coordinates and includes a translation vector representing the position of the imaging apparatus 100 and a rotation matrix representing the attitude of the imaging apparatus 100.

The position and the attitude of the imaging apparatus 100 can be estimated by acquiring the matrix M representing the camera intrinsic parameters. A structure from motion (SfM) method is known as a method of estimating the camera extrinsic parameters based on a plurality of feature points on the image.

The SfM method includes tracing the plurality of feature points on the image captured while moving the imaging apparatus 100 (camera), and calculating the position and the attitude of the camera and the three-dimensional positions of the feature points using the correspondence relationship between the feature points. In the SfM method, a relative position between the camera and the subject and a relative position and attitude between cameras can be estimated. However, scale information is not acquired using only the image. Thus, the absolute position cannot be estimated. Therefore, the absolute position can be estimated by providing absolute position information such as a marker having a known three-dimensional position, size information (for example, size information of the solar cell module 520) of the subject, or the like.

The composition information acquisition part 2b (FIG. 18) estimates the position and the attitude of the imaging apparatus 100 at the time of imaging each wide angle image of the wide angle image group as the composition information using the SfM method for the input wide angle image group.

The composition information acquisition part 2b is not limited to the case of using the SfM method and may use, for example, a simultaneous localization and mapping (SLAM) method. In the SLAM method, the positions of the feature points and the position and the attitude of the camera can be estimated at the same time using a set of feature points that are dynamically updated depending on a change of an input image. A basic principle of the SLAM method is disclosed in Andrew J. Davison, "Real-Time Simultaneous Localization and Mapping with a Single Camera", Proceedings of the 9th IEEE International Conference on Computer Vision Volume 2, 2003, pp. 1403-1410.

Figure 20:
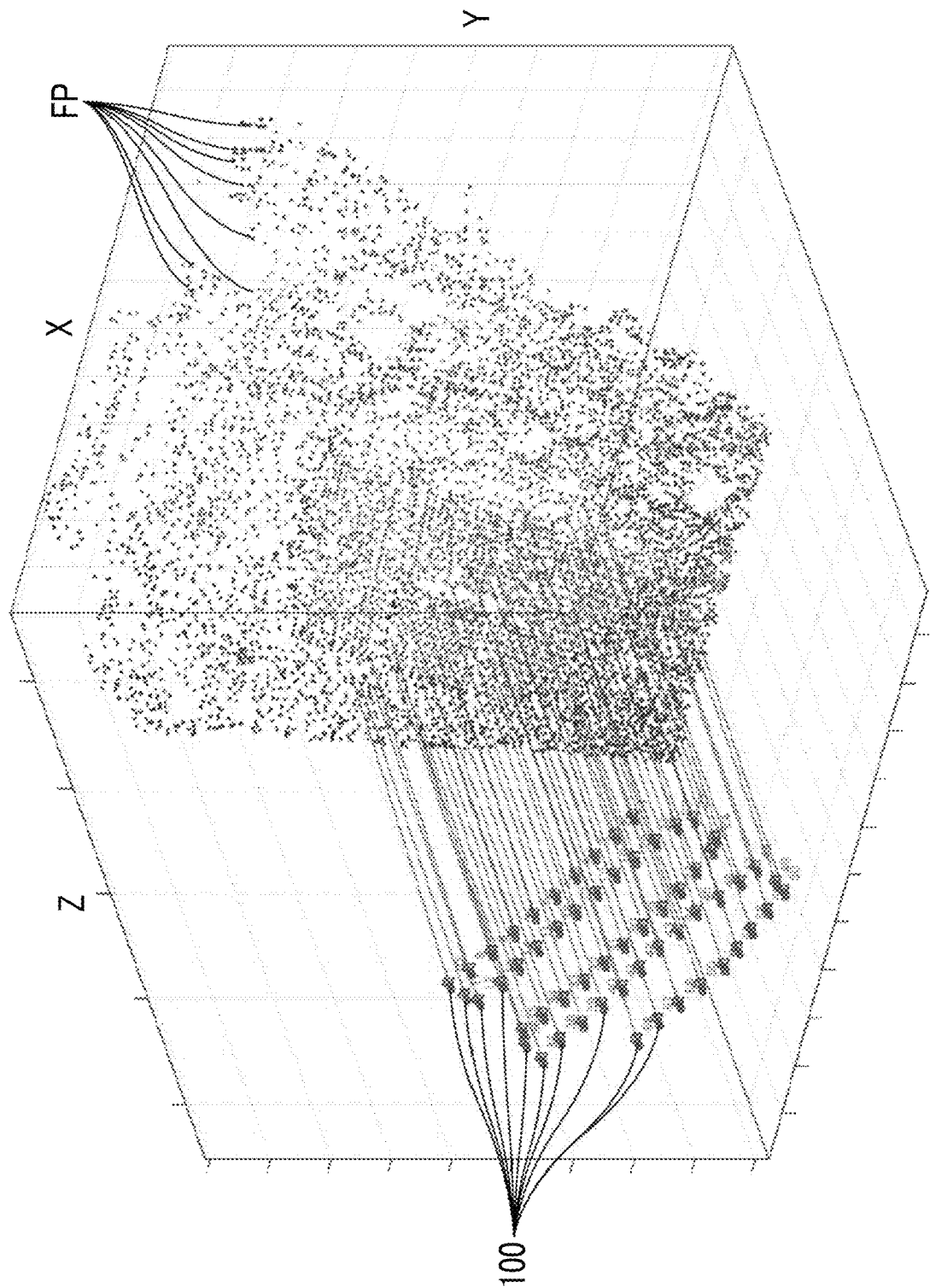
FIG. 20 is a diagram illustrating a position and an attitude of the imaging apparatus and three-dimensional positions of feature points estimated by a composition information acquisition part using a SfM method.

FIG. 20 is a diagram illustrating the position and the attitude of the imaging apparatus 100 and the three-dimensional positions of feature points FP estimated by the composition information acquisition part 2b using the SfM method.

In FIG. 20, the XYZ coordinate system is the world coordinate system. In the present example, the X-Y plane represents the horizontal plane, and the Z axis represents the height direction (altitude). A line segment from each imaging position of the imaging apparatus 100 to the horizontal plane denotes the imaging (optical axis) direction of the imaging apparatus 100.

Returning to FIG. 18, based on the composition information (in the present example, the position and the attitude of the imaging apparatus 100 and the like) acquired by the composition information acquisition part 2b, information related to the focal lengths of the wide angle optical system 320 and the telephoto optical system 310 (in the present example, the angle of view ratio (focal length ratio) between both optical systems), and the telephoto image group acquired by the image acquisition part 2a, the composite image generation part 2c generates an image in which the telephoto image group is composited.

Figure 21:
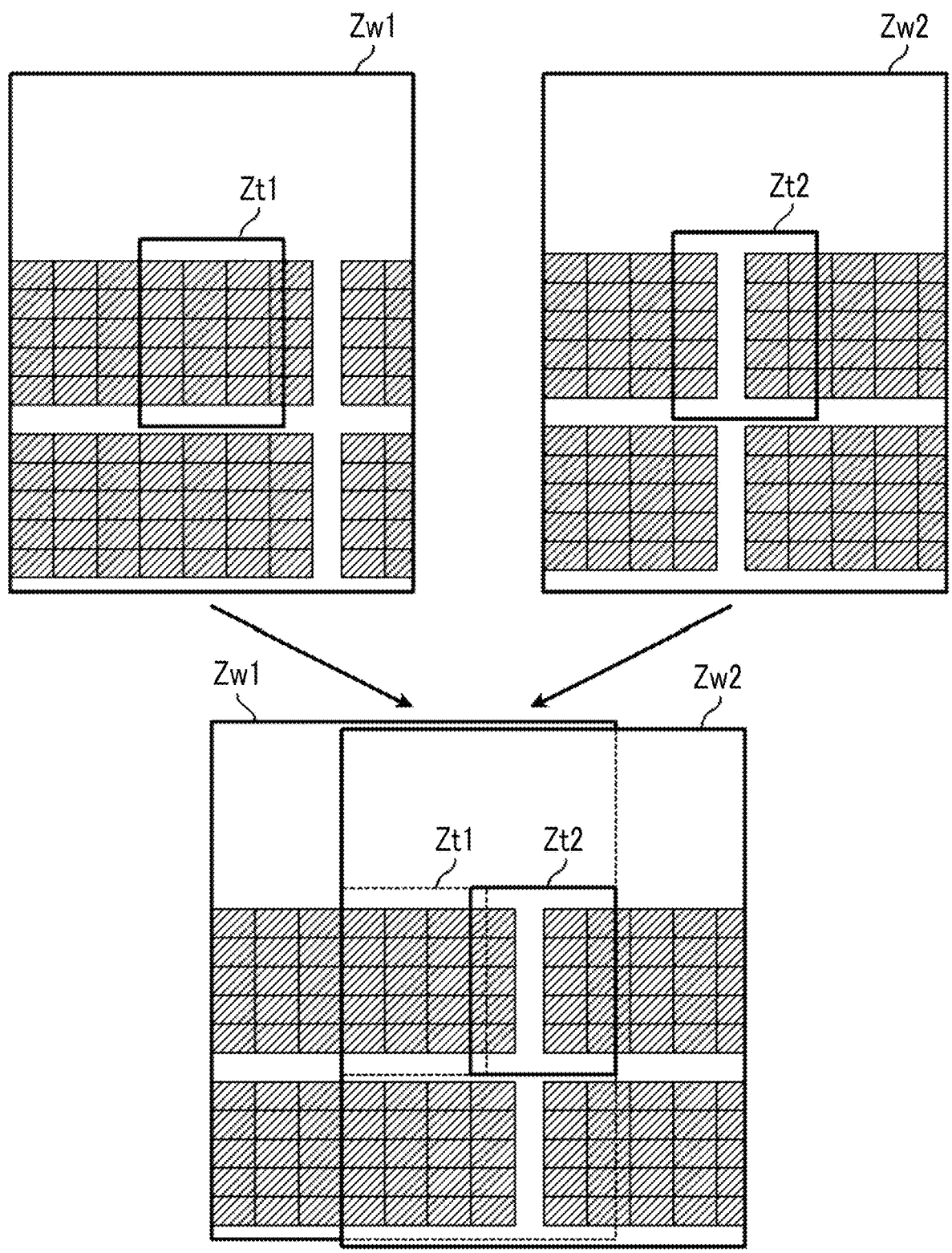
FIG. 21 is a diagram for describing a method of compositing two telephoto images based on two wide angle images.

FIG. 21 is a diagram illustrating a method of compositing two telephoto images based on two wide angle images.

In FIG. 21, imaging ranges Zw1 and Zw2 of two adjacent wide angle images overlap with each other in more than 50% of the whole image. The composition information acquisition part 2b acquires the composition information (the position and the attitude of the imaging apparatus 100 at the time of capturing each of the two wide angle images) based on a plurality of corresponding feature points in the overlapping region between the two wide angle images. The composite image generation part 2c can composite a wide angle image in which corresponding feature points are registered to overlap with each other by projecting the two wide angle images from the position of the imaging apparatus 100 at the time of capturing each of the two wide angle images to the imaging direction corresponding to the attitude of the imaging apparatus 100 using the horizontal plane as a projection plane.

However, in the present invention, each telephoto image that is captured at the same time as the wide angle image is used instead of the wide angle image. Two telephoto images are appropriately composited by performing projection according to the angle of view ratio ($\theta 1/\theta 2$) between an angle of view $\theta 1$ of the telephoto optical system 310 and an angle of view $\theta 2$ of the wide angle optical system 320 illustrated in FIG. 16. The matrix C (particularly, the focal length) which represents the camera intrinsic parameters and is illustrated in [Expression 1] is different between the telephoto optical system 310 and the wide angle optical system 320. Thus, by performing transformation according to the difference in camera intrinsic parameter, the two telephoto images can be appropriately composited using the composition information acquired by analyzing the wide angle image group.

It is preferable that imaging ranges Zt1 and Zt2 of the two composited telephoto images have a small overlapping part between both images. The reason is that the overlapping part between the adjacent telephoto images is not used for acquiring the composition information for compositing the telephoto images, and the number of times of capturing the telephoto image group can be significantly decreased by reducing the overlapping part between the telephoto images.

Even in a case where there is no overlapping part between the telephoto images, the telephoto image group can be composited. In this case, a gap is generated in the composited image. However, the gap can be filled by performing imaging again. The gap can also be filled with the wide angle image. In this case, the resolution of the image in the gap part is decreased.

Figure 22:
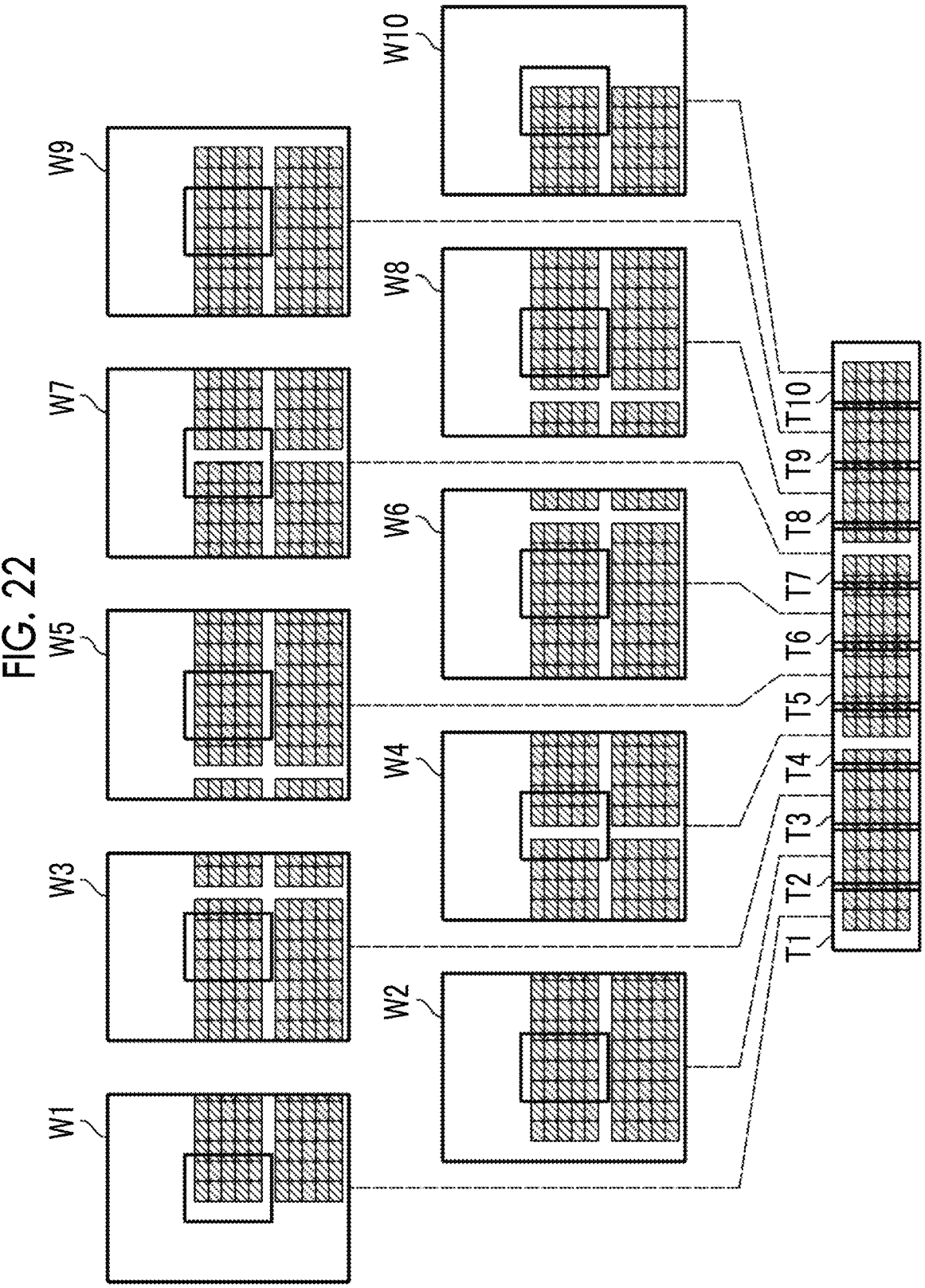
FIG. 22 is a conceptual diagram of generation of a composite image.

FIG. 22 is a conceptual diagram of generation of the composite image.

FIG. 22 illustrates 10 wide angle images W1 to W10 acquired in a case where the imaging apparatus 100 almost linearly flies, and 10 telephoto images T1 to T10 composited based on the composition information acquired from the wide angle images W1 to W10. In FIG. 22, the telephoto images T1 to T10 are illustrated in small size in order to illustrate the imaging ranges of the wide angle images W1 to W10 and the telephoto images T1 to T10. However, the image sizes of the telephoto images T1 to T10 are large (resolution is high).

Returning to FIG. 18, the composite image in which the telephoto image group is composited by the composite image generation part 2c can be displayed by outputting the composite image to the display part 3 and can also be stored by outputting the composite image to the recording part 4.

The display part 3 can use a monitor of the computer including the image generation apparatus 2. The recording part 4 can use a hard disk of the computer, a non-volatile memory in the computer, and an external memory such as a memory card that is attached to and detached from the computer.

A user can observe the subject (in the present example, the solar power generation facility 500) using the composite image displayed on the display part 3. Particularly, in the case of observing the solar power generation unit 510 constituting the solar power generation facility 500 and furthermore, the solar cell module 520 constituting the solar power generation unit 510 in detail (in the case of observing a stain, a defect, or the like in the solar power generation unit 510), the composite image can be enlarged and displayed on the display part 3. Even in the case of enlarging and displaying the composite image, the composite image has a high resolution and can be observed in detail because the composite image is generated by compositing the telephoto images.

In addition, each time one imaging is performed by the imaging apparatus 100, the image generation apparatus 2 can acquire the telephoto image and the wide angle image, which are captured at the same time, in real time and can display the composite image in which the telephoto images are sequentially composited on the display part 3 in real time. In this case, the user can check a region (remaining region) in which the telephoto image is not composited from the composite image displayed in real time on the display part 3 and can remotely operate the unmanned aerial vehicle 10 in order to image the remaining region.

Second Embodiment of Acquisition of Composition Information

The composition information acquisition part 2b illustrated in FIG. 18 analyzes the wide angle image group and extracts a plurality of feature points (a plurality of sets of correspondence points having a matching SIFT feature amount) present in the overlapping region between the adjacent wide angle images using any wide angle image as a reference.

Next, a projective transformation matrix of the adjacent wide angle image that sets the corresponding feature points of the adjacent wide angle image to match the plurality of feature points of the reference wide angel image is calculated.

The detected number (number of sets) of feature points having a matching feature amount needs to be greater than or equal to a number that is necessary for calculating transformation parameters used for geometrically transforming one of the two images.

A projective transformation expression is illustrated in the following expression.

$$X=(ax+by+s)/(px+qy+1)$$

$$Y=(cx+dy+t)/(px+qy+1) \quad \text{[Expression 2]}$$

The transformation parameters of the projective transformation refer to eight parameters of a, b, s, c, d, t, p, and q in [Expression 2]. Coordinate values before and after the projective transformation are denoted by (x, y) and (X, Y).

Accordingly, the eight transformation parameters used for the projective transformation can be calculated by building eight simultaneous equations acquired by substituting the coordinate values of each of the plurality of sets of feature points in [Expression 2] and solving the eight simultaneous equations.

The transformation parameters of the projective transformation are sequentially calculated based on the wide angle image group.

The transformation parameters of the projective transformation acquired by the composition information acquisition part 2b are input into the composite image generation part 2c as the composition information to be used for compositing the telephoto image group. The composite image generation part 2c projectively transforms the other telephoto image group with respect to the telephoto image corresponding to the reference wide angle image, based on the input composition information and the information related to the focal lengths of the wide angle optical system and the telephoto optical system, and composites the telephoto image group.

Third Embodiment of Acquisition of Composition Information

The composition information acquisition part 2b illustrated in FIG. 18 analyzes the wide angle image group and estimates the position and the attitude of the imaging apparatus 100 and the solid shape of the subject at the time of capturing each wide angle image of the wide angle image group as the composition information.

In this case, the wide angle image group is acquired by imaging the subject having a solid shape at various angles such that there is no region that is not imaged.

The solid shape of the subject is a collection of three-dimensional positions of a plurality of feature points having a matching feature between the wide angle images. It is preferable to appropriately interpolate the three-dimensional positions of the plurality of feature points and acquire high density three-dimensional positions.

The composite image generation part 2c generates an image in which the telephoto image group is composited by mapping a texture corresponding to the telephoto image group to a three-dimensional model surface of the subject including the three-dimensional positions of the plurality of feature points. That is, the composite image generation part 2c generates a polygon mesh for recognizing the shape of the subject based on the three-dimensional positions including the plurality of feature points acquired by the composition information acquisition part 2b, extracts a texture corresponding to the polygon mesh from the telephoto image group, and maps the texture to the generated polygon mesh.

The three-dimensional composite image (three-dimensional image) in which the telephoto image group is composited is recorded in the recording part 4. The composite image generation part 2c or an image playback part, not illustrated, can display the image of the subject seen from any viewpoint on the display part 3 by reading the three-dimensional image recorded in the recording part 4, designating a viewpoint position, a projection plane, and the like, and projecting the three-dimensional image.

[Image Generation Method]

Figure 23:
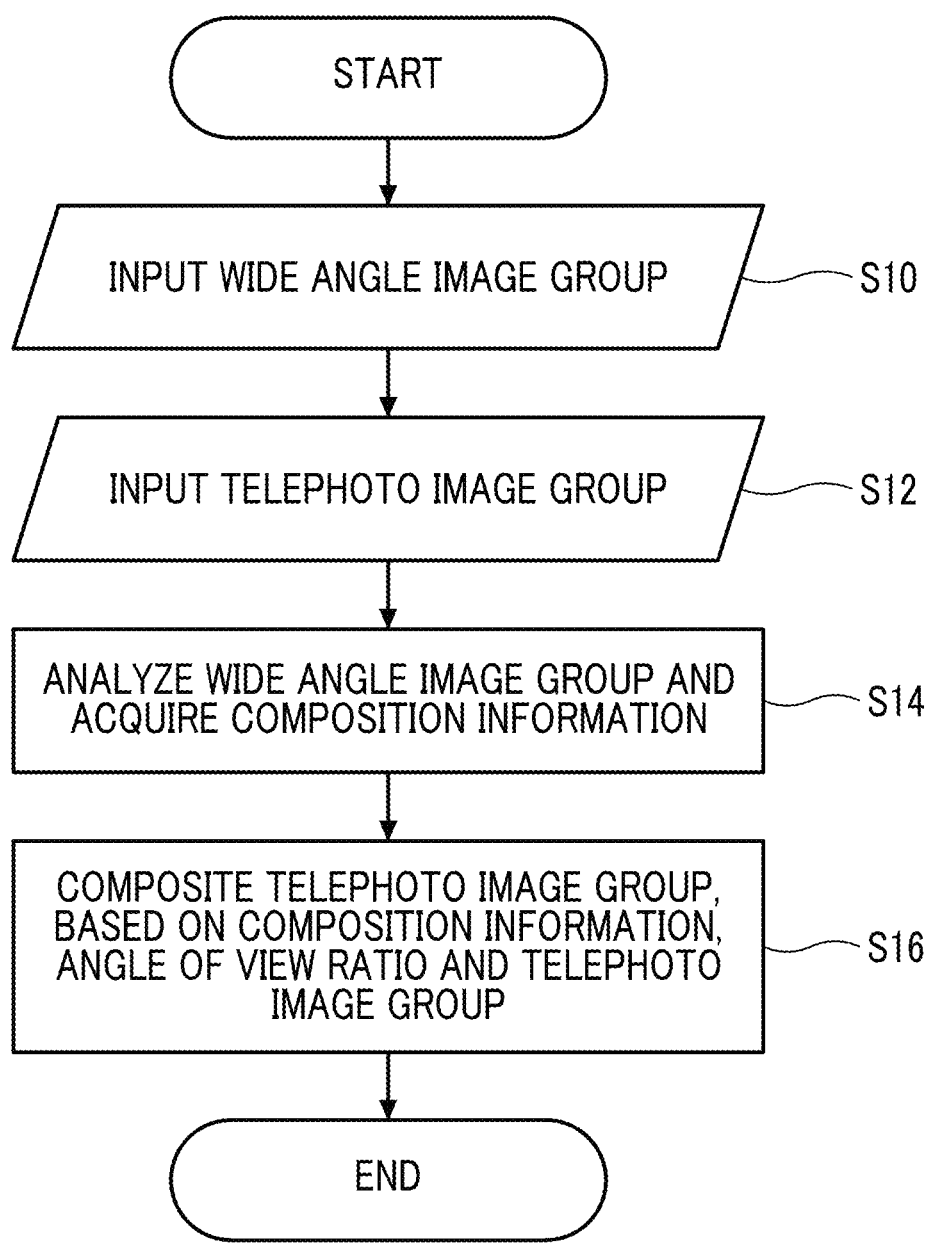
FIG. 23 is a flowchart illustrating a first embodiment of an image generation method according to the embodiment of the present invention.

FIG. 23 is a flowchart illustrating a first embodiment of the image generation method according to the embodiment of the present invention.

In FIG. 23, the wide angle image group and the telephoto image group captured by the imaging apparatus 100 are input into the image acquisition part 2a of the image generation apparatus 2 (steps S10 and S12). Each time one imaging is performed by the imaging apparatus 100, the telephoto image and the wide angle image captured at the same time may be input in real time, or the wide angle image group and the telephoto image group may be collectively input after the end of imaging.

The composition information acquisition part 2b analyzes the input wide angle image group and acquires the composition information to be used for compositing the telephoto image group (step S14).

The composite image generation part 2c generates the composite image in which the telephoto image group is composited based on the composition information acquired in step S14, the information (angle of view ratio) related to the focal lengths of the wide angle optical system and the telephoto optical system of the imaging apparatus 100, and the telephoto image group (step S16). The generation of the composite image is such that composition is performed by projecting each telephoto image of the telephoto image group to the imaging direction of the imaging apparatus 100 from the position of the imaging apparatus 100 according to the angle of view ratio between the wide angle optical system and the telephoto optical system.

An image in the center region (region corresponding to the angle of view of the telephoto image) of each image of the wide angle image group and each image of the telephoto image group have different resolutions but are the same image. Thus, the composition information acquired by analyzing the wide angle image group can be used for compositing the telephoto image group.

Accordingly, the number of times of capturing the telephoto image group can be significantly decreased, and a high resolution composite image can be generated.

Figure 24:
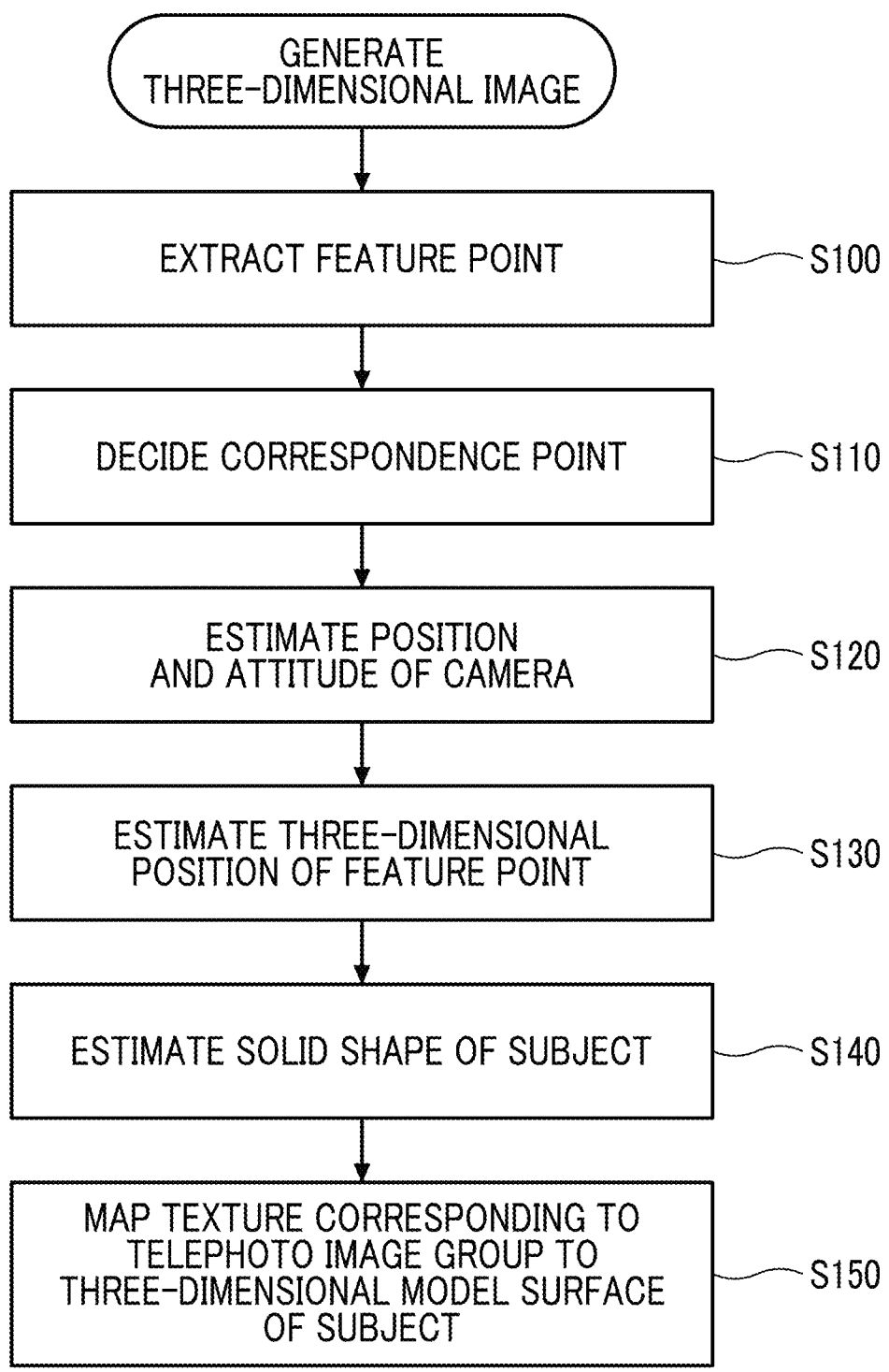
FIG. 24 is a flowchart illustrating a second embodiment of the image generation method according to the embodiment of the present invention and particularly, a flowchart illustrating a processing procedure of generating a three-dimensional image.

FIG. 24 is a flowchart illustrating a second embodiment of the image generation method according to the embodiment of the present invention and particularly, illustrates a processing procedure of generating the three-dimensional image by the composition information acquisition part 2b and the composite image generation part 2c.

In FIG. 24, the composition information acquisition part 2b extracts feature points included in a region (overlapping region) in which each wide angle image of the wide angle image group overlaps (step S100), and decides a correspondence relationship (correspondence points having a matching local feature amount) of the feature points between the wide angle images (step S110).

Next, the composition information acquisition part 2b estimates the position and the attitude of the imaging apparatus 100 based on the plurality of corresponding feature points between the wide angle images (step S120). In addition, the composition information acquisition part 2b estimates the three-dimensional positions of the feature points at the same time from the estimation result of the position and the attitude of the imaging apparatus 100 (step S120).

The estimation of the position and the attitude of the imaging apparatus 100 can be performed by acquiring the matrix M representing the camera extrinsic parameters illustrated in [Expression 1] based on the image coordinates of the plurality of feature points. The SfM method and the SLAM methods are known as a method of estimating the camera extrinsic parameters based on feature points on a plurality of images.

The solid shape of the subject including the three-dimensional positions of the feature points estimated in step S130 is estimated (step S140). An image (three-dimensional image) in which the telephoto image group is composited is generated by mapping a texture corresponding to the telephoto image group to the estimated solid shape (three-dimensional model surface) of the subject (step S150).

[Others]

The image generation apparatus may be incorporated in the imaging apparatus or may be connected to the imaging apparatus. Alternatively, the image generation apparatus may be separated from the imaging apparatus.

While the imaging apparatus is mounted on the unmanned aerial vehicle, the imaging apparatus is not limited to the unmanned aerial vehicle and may be mounted on a manned aerial vehicle, an artificial satellite, an automobile, a robot, and other moving objects. The imaging apparatus may be mounted on a tripod head or the like, and imaging may be performed while turning the camera. Furthermore, imaging may be performed while a person holds the imaging apparatus in a hand and changes the position of the imaging apparatus. In this case, the moving object is not necessary.

The image generation program which is installed on the computer for causing the computer to function as the image generation apparatus, and a computer-readable recording medium (non-transitory recording medium) on which the image generation program is recorded are also one aspect of the present invention.

The composition information acquired by analyzing the wide angle image group is not limited to the present embodiment. Any composition information that is to be used for compositing the telephoto image group and is acquired based on a plurality of feature points included in the overlapping region between the wide angle images may be used. The composited telephoto image may be a two-dimensional image or a three-dimensional image.

The present invention is not limited to the above embodiments. Various modifications can be made without departing from the spirit of the present invention.

EXPLANATION OF REFERENCES

1: image generation system
2: image generation apparatus
2a: image acquisition part
2b: composition information acquisition part 2c: composite image generation part
3: display part
4, 124, 232: recording part
10: unmanned aerial vehicle
12: controller
12a: controller operation part
12b: controller display part
12c: controller side wireless communication part
12d: controller micom
14: main body frame
14A: torso portion
14B: arm portion
14C: leg portion
16: propeller
20: propeller drive motor
22: motor driver
24: sensor part
26: vehicle side wireless communication part
28: vehicle side wired communication part
30: unmanned aerial vehicle micom
30a: movement control part
30b: camera control part
30c: vehicle side wireless communication control part
30d: vehicle side wired communication control part
100: imaging apparatus
210: image sensor
210a: image sensor driver
212A: first pixel
212B: second pixel
214: photodiode
216: microlens
218: light blocking mask
230: analog signal processing part
234: camera side wired communication part
236: camera micom
236a: digital signal processing part
236b: recording control part
236c: camera side wired communication control part
236d: imaging control part
236e: stop control part
236f: focusing control part
236g: lens position detection part
300: imaging lens
310: telephoto optical system
310a: first lens
310b: first mirror
310c: second mirror
310d: stop
320: wide angle optical system
320a: first lens
320b: second lens
320c: stop
320d: third lens
320e: fourth lens
330: common lens
340: focusing motor
340a: focusing motor driver
342a: photointerrupter
342b: MR sensor
344: stop motor
344a: stop driver
500: solar power generation facility
510: solar power generation unit
520: solar cell module
FP: feature point
Im1, Im2: image
L: optical axis
L1, L2: light
M: matrix
O: origin
R: arrow
S10 to S16, S100 to S150: step
T1 to T10: telephoto image
W1 to W10: wide angle image
X1, X2: range
Zt, Zt1, Zt2, Zw, Zw1, Zw2: imaging range
θ1, θ2: angle of view

What is claimed is:

1. An image generation apparatus comprising:
an image acquisition part that acquires a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group;
a composition information acquisition part that analyzes the acquired wide angle image group and acquires composition information to be used for compositing the telephoto image group; and
a composite image generation part that generates an image in which the telephoto image group is composited based on the composition information, information related to focal lengths of the wide angle optical system and the telephoto optical system, and the telephoto image group.

2. The image generation apparatus according to claim 1,
wherein the composition information acquisition part analyzes the acquired wide angle image group and estimates the position and an attitude of the imaging apparatus at a time of capturing each wide angle image of the wide angle image group as the composition information, and
the composite image generation part composites the telephoto image group based on the position and the attitude of the imaging apparatus and an angle of view ratio between the wide angle optical system and the telephoto optical system.

3. The image generation apparatus according to claim 2,
wherein the composite image generation part performs the composition by projecting each telephoto image of the telephoto image group to an imaging direction of the imaging apparatus from the position of the imaging apparatus according to the angle of view ratio.

4. The image generation apparatus according to claim 1,
wherein the composition information acquisition part analyzes the acquired wide angle image group and estimates the position and an attitude of the imaging apparatus at a time of capturing each wide angle image of the wide angle image group and a solid shape of the subject as the composition information, and
the composite image generation part composites the telephoto image group based on the position and the attitude of the imaging apparatus, the solid shape of the subject, and the information related to the focal lengths of the wide angle optical system and the telephoto optical system.

5. The image generation apparatus according to claim 4,
wherein the composition information acquisition part extracts a plurality of feature points in a region in which each wide angle image of the wide angle image group overlaps, and estimates three-dimensional positions of the extracted plurality of feature points as the solid shape of the subject, and the composite image generation part generates the image in which the telephoto image group is composited by mapping a texture corresponding to the telephoto image group to a three-dimensional model surface of the subject including the three-dimensional positions of the plurality of feature points.

6. The image generation apparatus according to claim 1, wherein the composition information acquisition part estimates the position and an attitude of the imaging apparatus at a time of capturing each wide angle image of the wide angle image group and a solid shape of the subject using a structure from motion method or a simultaneous localization and mapping method.

7. The image generation apparatus according to claim 2, wherein the composition information acquisition part estimates the position and the attitude of the imaging apparatus at a time of capturing each wide angle image of the wide angle image group and a solid shape of the subject using a structure from motion method or a simultaneous localization and mapping method.

8. The image generation apparatus according to claim 3, wherein the composition information acquisition part estimates the position and the attitude of the imaging apparatus at a time of capturing each wide angle image of the wide angle image group and a solid shape of the subject using a structure from motion method or a simultaneous localization and mapping method.

9. The image generation apparatus according to claim 4, wherein the composition information acquisition part estimates the position and the attitude of the imaging apparatus at a time of capturing each wide angle image of the wide angle image group and a solid shape of the subject using a structure from motion method or a simultaneous localization and mapping method.

10. An image generation system comprising:
an imaging apparatus including an imaging optical system that includes a wide angle optical system and a telephoto optical system having a common optical axis, a directional sensor that includes a plurality of pixels which are configured with two-dimensionally arranged photoelectric conversion elements and selectively receive each of luminous fluxes incident through the wide angle optical system and the telephoto optical system by pupil separation, and an image reading part that acquires a wide angle image received through the wide angle optical system and a telephoto image received through the telephoto optical system at the same time from the directional sensor; and
the image generation apparatus according to claim 1,
wherein the image acquisition part acquires the wide angle image group and the telephoto image group by acquiring the wide angle image and the telephoto image that are captured while changing the position of the imaging apparatus and are read by the image reading part.

11. The image generation system according to claim 10, wherein one optical system of the wide angle optical system and the telephoto optical system of the imaging optical system is a central optical system having a circular shape, and the other optical system is an annular optical system that is concentrically arranged with respect to the central optical system.

12. The image generation system according to claim 10, further comprising:
a focal point adjusting part that adjusts a focal point of the telephoto optical system.

13. The image generation system according to claim 10, further comprising:
a moving object on which the imaging apparatus is mounted.

14. The image generation system according to claim 13, wherein the moving object is an aerial vehicle or an artificial satellite.

15. An image generation method comprising:
a step of acquiring a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group;
a step of analyzing the acquired wide angle image group and a step of acquiring composition information to be used for compositing the telephoto image group; and
a step of generating an image in which the telephoto image group is composited based on the composition information, information related to focal lengths of the wide angle optical system and the telephoto optical system, and the telephoto image group.

16. The image generation method according to claim 15, wherein in the step of acquiring the composition information, the acquired wide angle image group is analyzed, and the position and an attitude of the imaging apparatus at a time of capturing each wide angle image of the wide angle image group are estimated as the composition information, and
in the step of generating the image, the telephoto image group is composited based on the position and the attitude of the imaging apparatus and an angle of view ratio between the wide angle optical system and the telephoto optical system.

17. The image generation method according to claim 16, wherein in the step of generating the image, the composition is performed by projecting each telephoto image of the telephoto image group to an imaging direction of the imaging apparatus from the position of the imaging apparatus according to the angle of view ratio.

18. The image generation method according to claim 15, wherein in the step of acquiring the composition information, the acquired wide angle image group is analyzed, and the position and an attitude of the imaging apparatus at a time of capturing each wide angle image of the wide angle image group and a solid shape of the subject are estimated as the composition information, and
in the step of generating the image, the telephoto image group is composited based on the position and the attitude of the imaging apparatus, the solid shape of the subject, and the information related to the focal lengths of the wide angle optical system and the telephoto optical system.

19. The image generation method according to claim 18, wherein in the step of acquiring the composition information, a plurality of feature points in a region in which each wide angle image of the wide angle image group overlaps are extracted, and three-dimensional positions of the extracted plurality of feature points are estimated as the solid shape of the subject, and in the step of generating the image, the image in which the telephoto image group is composited by mapping a texture corresponding to the telephoto image group to a three-dimensional model surface of the subject including the three-dimensional positions of the plurality of feature points is generated.

20. A non-transitory computer readable recording medium storing an image generation program causing a computer to implement:

a function of acquiring a wide angle image group and a telephoto image group in which a subject is imaged while changing a position of an imaging apparatus, the wide angle image group being captured by the imaging apparatus including an imaging optical system including a wide angle optical system and a telephoto optical system having a common optical axis, and the telephoto image group being captured at the same time as the wide angle image group;

a function of analyzing the acquired wide angle image group and acquiring composition information to be used for compositing the telephoto image group; and a function of generating an image in which the telephoto image group is composited based on the composition information, information related to focal lengths of the wide angle optical system and the telephoto optical system, and the telephoto image group.

* * * * *